United States Patent
Nandakumar et al.

(10) Patent No.: US 10,863,179 B1
(45) Date of Patent: Dec. 8, 2020

(54) OVERLAPPED RATE CONTROL FOR HIGH-QUALITY SEGMENTED VIDEO ENCODING

(71) Applicant: Amazon Technologies, Inc., Seattle, WA (US)

(72) Inventors: Deepthi Nandakumar, Bengaluru (IN); Charles Benjamin Franklin Waggoner, Portland, OR (US)

(73) Assignee: Amazon Technologies, Inc., Seattle, WA (US)

( * ) Notice: Subject to any disclaimer, the term of this patent is extended or adjusted under 35 U.S.C. 154(b) by 38 days.

(21) Appl. No.: 16/122,436

(22) Filed: Sep. 5, 2018

(51) Int. Cl.
*H04N 11/02* (2006.01)
*H04N 19/147* (2014.01)
*H04N 19/436* (2014.01)
*H04N 19/164* (2014.01)

(52) U.S. Cl.
CPC ......... *H04N 19/147* (2014.11); *H04N 19/164* (2014.11); *H04N 19/436* (2014.11)

(58) Field of Classification Search
CPC .................................................. H04N 19/147
USPC ...................................... 375/240.01–240.29
See application file for complete search history.

(56) References Cited

U.S. PATENT DOCUMENTS

| | | | | |
|---|---|---|---|---|
| 6,278,735 B1 * | 8/2001 | Mohsenian | .......... | H04N 19/176 375/240 |
| 6,577,681 B1 * | 6/2003 | Kimura | ................ | H04N 19/176 375/240.03 |
| 8,270,473 B2 * | 9/2012 | Chen | ................... | H04N 19/124 375/240.03 |
| 8,625,681 B2 * | 1/2014 | Xu | ........................ | H04N 19/147 375/240.27 |
| 9,350,988 B1 * | 5/2016 | Bankoski | .............. | H04N 19/103 |
| 9,712,860 B1 * | 7/2017 | Waggoner | .......... | H04N 21/2662 |
| 9,888,051 B1 * | 2/2018 | Rosenzweig | ......... | H04L 65/605 |
| 9,973,785 B1 * | 5/2018 | Yang | .................. | H04N 21/2187 |
| 10,382,784 B2 * | 8/2019 | Henry | .................... | H04N 19/25 |
| 10,499,070 B2 * | 12/2019 | Coward | ............... | H04N 19/149 |
| 2004/0240556 A1 * | 12/2004 | Winger | ............... | H04N 19/176 375/240.18 |

(Continued)

OTHER PUBLICATIONS

Aboalmaaly M.F., et al., "Parallel H.264/AVC Encoder: a Survey," International Journal of Advancements in Computing Technology (IJACT), May 2013, vol. 5 (9), pp. 334-341.

*Primary Examiner* — Leron Beck
(74) *Attorney, Agent, or Firm* — Nicholson De Vos Webster & Elliott LLP

(57) ABSTRACT

Techniques for high-quality, segmented video encoding are described. As one example, a computer-implemented method includes receiving a video file, splitting the video file into a plurality of chunks comprising a first chunk of the video file and a second chunk of the video file that is later in video order than the first chunk, encoding the first chunk into a first encoded chunk, determining, separately from the encoding of the first chunk, a rate control state element for a section of the video file immediately before the second chunk in video order, encoding, separately from the encoding of the first chunk, the second chunk into a second encoded chunk using the rate control state element, and assembling the first encoded chunk and the second encoded chunk together to form an encoded video file.

20 Claims, 14 Drawing Sheets

(56) References Cited

U.S. PATENT DOCUMENTS

| | | | | |
|---|---|---|---|---|
| 2007/0116117 | A1* | 5/2007 | Tong | H04N 19/172 375/240.08 |
| 2009/0220003 | A1* | 9/2009 | Streater | G11B 27/034 375/240.15 |
| 2009/0304292 | A1* | 12/2009 | Chen | H04N 19/176 382/233 |
| 2010/0046628 | A1* | 2/2010 | Bhaskaran | H04N 19/103 375/240.24 |
| 2010/0080290 | A1* | 4/2010 | Mehrotra | H04N 19/147 375/240.07 |
| 2011/0091121 | A1* | 4/2011 | Fukuhara | H04N 19/647 382/234 |
| 2012/0014433 | A1* | 1/2012 | Karczewicz | H03M 7/40 375/240.02 |
| 2012/0147958 | A1* | 6/2012 | Ronca | H04N 19/124 375/240.16 |
| 2012/0230391 | A1* | 9/2012 | Huang | H04N 19/436 375/240.02 |
| 2014/0269905 | A1* | 9/2014 | Frigo | H04N 19/15 375/240.03 |
| 2015/0319441 | A1* | 11/2015 | Puri | H04N 19/61 375/240.02 |
| 2017/0085886 | A1* | 3/2017 | Jacobson | H04N 19/156 |
| 2017/0118473 | A1* | 4/2017 | Thirumalai | H04N 19/46 |
| 2018/0097864 | A1* | 4/2018 | Brinkley | H04L 65/4084 |

* cited by examiner

OVERLAPPED RATE CONTROL FOR HIGH-QUALITY SEGMENTED VIDEO ENCODING

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public. Service providers or content creators (such as businesses, artists, media distribution services, etc.) can employ one or more data centers to deliver content (such as web sites, web content, or other digital data) to users or clients.

BRIEF DESCRIPTION OF DRAWINGS

Various embodiments in accordance with the present disclosure will be described with reference to the drawings, in which.

DETAILED DESCRIPTION

Figure 1:
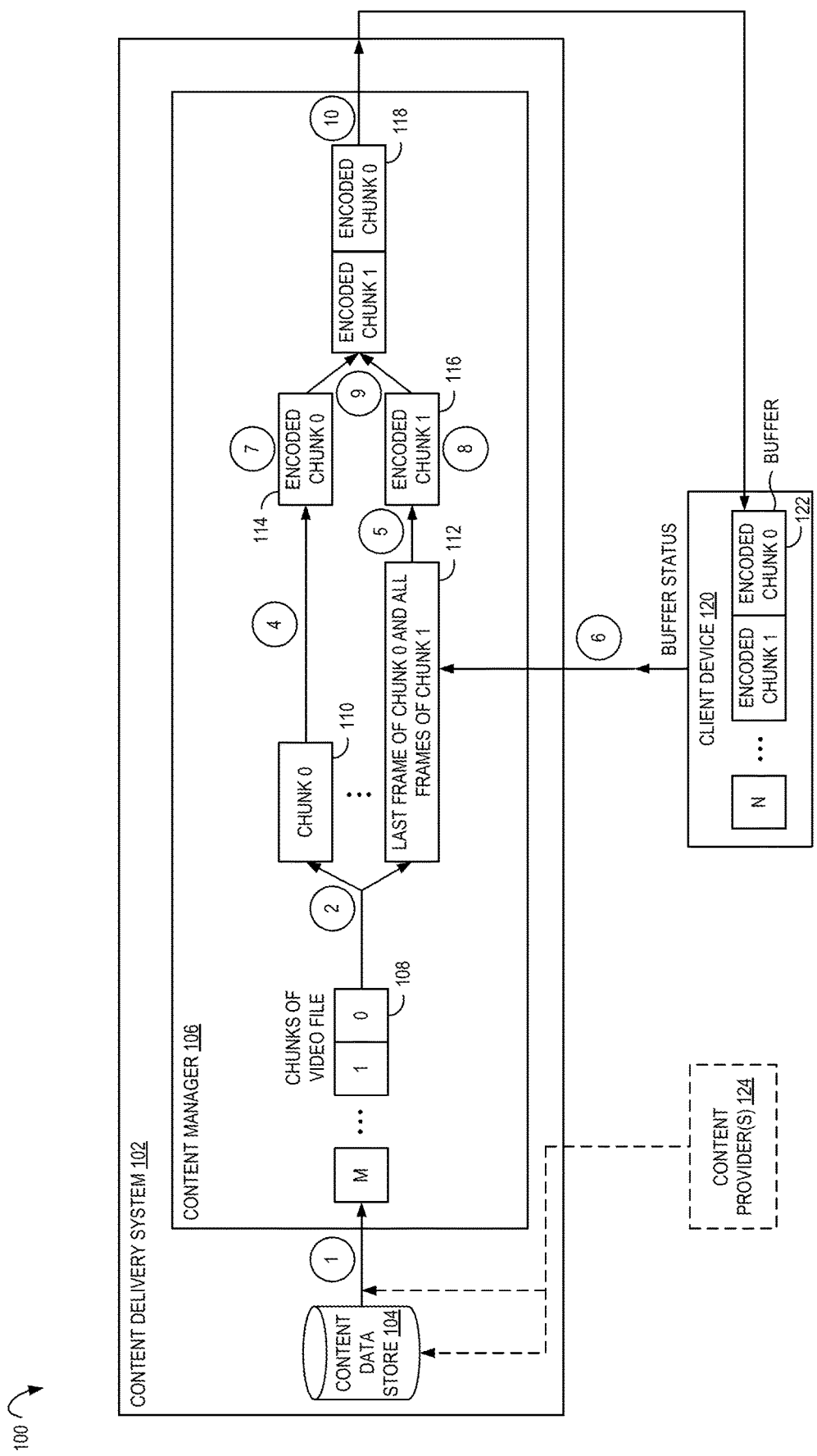
FIG. 1 is a diagram illustrating an environment including a content delivery system to encode chunks of a video and send the encoded chunks of the video to a client device according to some embodiments.

Various embodiments of methods, apparatuses, systems, and non-transitory computer-readable storage media for overlapped rate control for high-quality segmented video encoding are described. According to some embodiments, a video file is split into segments (e.g., "chunks") to enable fast encoding, and a first portion and a second portion or portions of the video file are encoded in parallel by overlapped segmented encoding. As one example, overlapped segmented encoding controls the bit and quality allocations across a chunk of a video file using knowledge of encoding complexity of past frame(s) and/or future frame(s) beyond the chunk.

In certain embodiments, overlapped segmented encoding provides a novel system and method of parallel encoding of large videos, maintains high performance, and improves perceptual quality. Overlapped segmented encoding minimizes or prevents overflow at segment (e.g., chunk) boundaries of a buffer (e.g., coded picture buffer (CPB) or video buffering verifier buffer (VBV buffer)) of a client device receiving a parallel encoded video file in certain embodiments. Overlapped segmented encoding minimizes or prevents video quality discontinuities at segment boundaries of a parallel encoded video file in certain embodiments. Overlapped segment encoding does not impact or minimally impacts parallel encoding performance in certain embodiments. In certain embodiments, overlapped segmented encoding provides content delivery that achieves a consistent level of quality from the user's perspective on the client device.

Parallel encoding using chunks removes information of past and future frames at both beginning and ending boundaries of a chunk. In certain embodiments of an overlapped segment encoding system, each encoder encodes the same number of frames as without overlapped segmented encoding, but the overlapped segments ensure that the rate control state analysis is optimized. The rate control state element may include a buffer status value (e.g., indicating its fullness level) of the client buffer (e.g., CPB or VBV buffer), average bitrate metrics, metrics about the frame complexity and/or relationship (e.g., difference) between successive frames, etc. In one embodiment, a rate controller of a content delivery system uses data (e.g., rate control state element(s)) generated by overlapped segmented encoding.

As one example, an input stream of content (e.g., a video file) to be encoded includes frames numbering 0 to N, the encode start point is denoted as X, and the encode end point is denoted as Y, where 0 is less than or equal to X and Y is less than or equal to N. In certain embodiments, overlapped segment encoding system determines at least one rate control state element starting with frame 0 and populates the encoder for frame X to frame Y with the at least one rate control state element, however, the input (e.g., bit) stream from 0 to X−1 is then discarded. Additionally, as encoding reaches encode end point Y, the overlapped segment encoding system in this example uses frames from Y+1 to N to generate at least one rate control state element (or other future statistics), but encoding stops at frame Y. Thus (e.g., CPB) client buffer violations are eliminated and video quality discontinuities at the chunk boundaries of X and Y are reduced since the encoder instance(s) have past and future frame visibility at these boundaries in this example of overlapped segment encoding. Overlapped segment encoding is codec agnostic, e.g., it may be used with any video coding specification (e.g., MPEG or H.264).

FIG. 1 is a diagram illustrating an environment 100 including a content delivery system 102 to encode chunks of a video and send the encoded chunks of the video to a client device 120 according to some embodiments. The depicted content delivery system includes a content data store 104, which may be implemented in one or more data centers. The circled numbers may be specific instances of time, but not necessarily in the depicted numerical order. At time circled one, the video file (e.g., a bitstream of a video) that is to be encoded in parallel is accessed from the content data store by content manager 106. In one embodiment, the client device 120 requesting the video file from content delivery system 102 causes the content manager 106 to start the encoding process, e.g., beginning with accessing the video file and splitting the video file into (e.g., equal file size or video length) chunks 108. An example of content manager 106 is discussed in reference to FIG. 2 below. At time circled two, the content manager 106 splits the video file into segments (e.g., chunks). In one embodiment, each chunk is a proper subset of the total frames of the video file.

Figure 2:
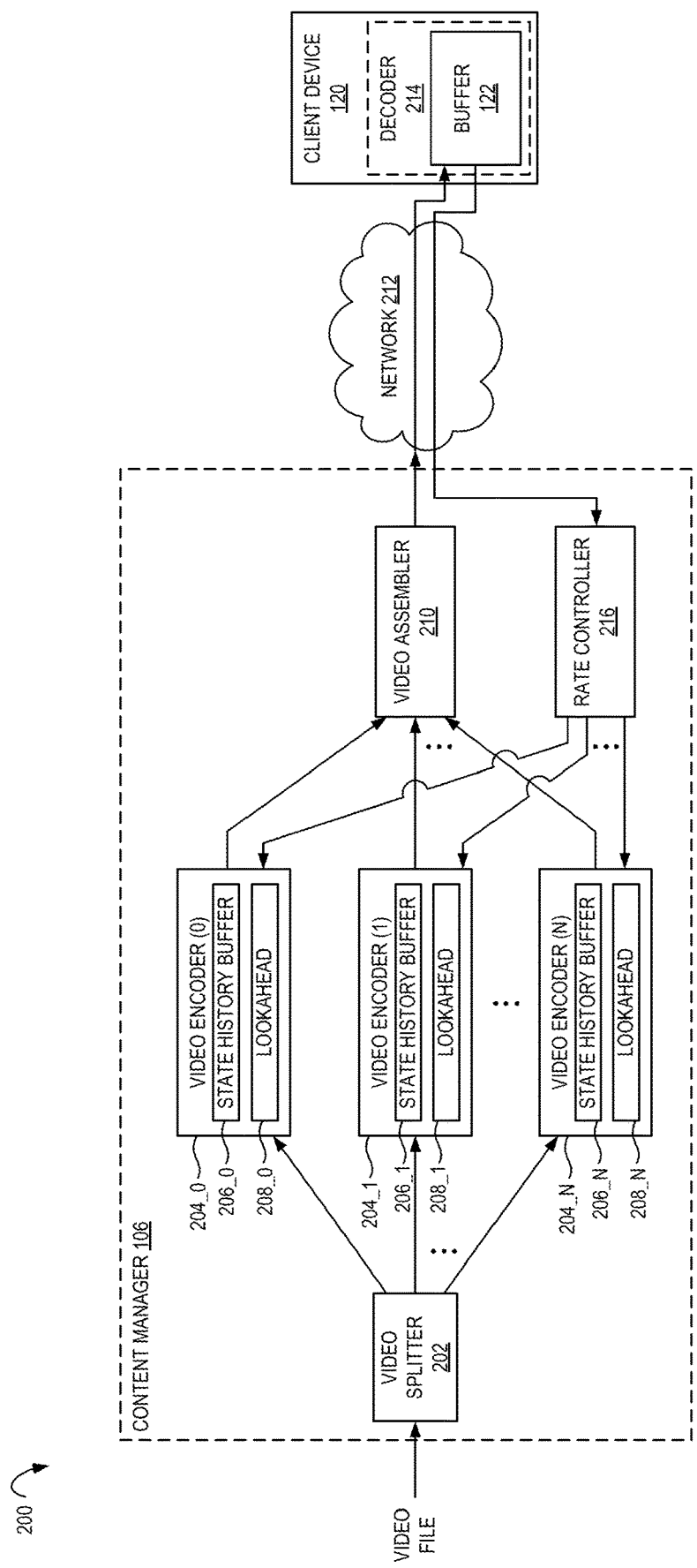
FIG. 2 is a block diagram depicting an illustrative configuration of a content manager with parallel video encoders to implement the content delivery system of FIG. 1 according to some embodiments.

In contrast to encoding without overlapped segment encoding, content manager 106 that implements overlapped segment encoding is to provide a first chunk 110 at time circled four to one of the parallel encoding instances (e.g., video encoder 204_0 in FIG. 2) and (e.g., in parallel) provide all the frames of a second chunk 112 in addition to at least one frame of the video file immediately before the second chunk (e.g., at least one frame from the first chunk) at time circled five (e.g., at substantially the same time as time circled four) to another of the parallel encoding instances (e.g., video encoder 204_1 in FIG. 2). As discussed further in reference to FIGS. 3-5 below, content manager 106 (e.g., a specific encoding instance) is to determine at least one rate control state element for the overlapping segment(s).

As one example, encoding of chunk 0 (reference number 110) begins at time circled four and in parallel (e.g., occurring at least partially at the same time), processing of second chunk (reference number 112) begins. Where the end (e.g., final frame or two) of chunk 0 has not been encoded, or other processing performed on by its parallel encoding instance, there is no rate control state element (or other statistics) yet generated for the end (e.g., final frame or two) of chunk 0, so the content manager 106 (e.g., second parallel encoding instance thereof) is to determine one or more rate control state elements for the end of the first chunk (chunk 0) for use in the encoding of the second chunk into a second encoded chunk. In one embodiment, the one or more rate control state elements are determined by a lookahead instance of the encoding instance. In another embodiment, the one or more rate control state elements are determined by a lookahead instance separate from an encoding instance. In certain embodiments, the lookahead operation uses a lower resolution of examination of the chunk and does not perform a full encode on the chunk to generate the one or more rate control state elements (e.g., metrics about the complexity of the frame, including, but not limited to, changes between the previous frame (number of pixels), content type, etc.). After one or more rate control state elements are determined, the encoding of chunk 1 begins (e.g., at least partially at the same time as the encoding of chunk 0). At time circled six, (e.g., fullness) status of buffer 122 in client device that is to receive the encoded video file (e.g., stream) into its buffer 122 is read by content manager 106, for example, so that content manager 106 controls the encoding of the chunks according to the status. As one example, the content manager 106 controls the encoding instances to avoid overflowing buffer 122. The content manager 106 may control the resolution, bitrate, frame rate, and/or other encoding parameters for the encoding of each chunk.

At time circled seven, the encoding of chunk 0 is complete to create an output 114 of (e.g., only) encoded chunk 0. At time circled eight, the encoding of chunk 1 is complete to create an output 116 of (e.g., only) encoded chunk 1. In one embodiment, time circled eight indicates the time to complete encoding of chunk 1 plus the time is takes to generate the one or more rate control state elements for the overlapping chunk(s) to be used in the encoding of chunk 1. At time circled nine, the encoded chunk 0 and encoded chunk 1 (which follows chunk 0 in video order in the video file) are stitched together (e.g., assembled) to create a continuous section of video 118 of encoded chunk 0 followed by encoded chunk 1. At time circled ten, the encoded video file (e.g., sections thereof) is transmitted into buffer 122 of client device 120, e.g., for the client device 120 to decode the encoded video file and display the decoded video. One example of a client device is discussed in reference to FIG. 10. Although two chunks are discussed in reference to FIG. 1, three or more chunks may be encoded with overlapped segment encoding. A video file may be stripped from a multimedia file that includes corresponding video and audio files. The overlapping may be immediately before the beginning of a to-be-encoded chunk (e.g., frame 5 or frames 4 and 5 of chunk 1 in FIG. 3) and/or be immediately after the end of a to-be-encoded chunk (e.g., frame 12 or frames 12 and 13 of chunk 1 in FIG. 3).

Encoding may include converting data from a first format to a second (e.g., compressed) format used in transmitting the data according to the second format. In one embodiment, data in the second format is an interframe compression of data from the first format. In one embodiment, content manager 106 splits the video file into M number of chunks that are processed in parallel, where M is any positive integer and/or M is less than the total number of chunks in an entire video file. In certain embodiments, buffer 122 of client device stores N number of encoded chunks, where N is any positive integer (e.g., where N is less than the total number of chunks in the entire video file and/or where N is greater than, less than, or equal to M). Chunk 0 may be the start of a video file or may be another chunk of the video file. Optionally, content provider(s) 124 may be included to provide a video file, for example, directly to the content manager 106 without utilizing the content data store 104 or into storage in content data store 104.

In certain embodiments, content manager 106 that implements overlapped segment encoding does not perform an initial analysis pass before outputting the encoded chunks and/or does not perform a refinement pass before outputting the encoded chunks. In certain embodiments, content manager 106 that implements overlapped segment encoding decouples the number of frames the lookahead sees (e.g., allowing viewing into the overlapping region) from the number of frames that are encoded. In certain embodiments, content manager 106 that implements overlapped segment encoding does not require any adjustment to the output from the parallel encoding instances and/or a first walk through of the to-be-encoded chunks. In certain embodiments, content manager 106 that implements overlapped segment encoding provides the same quality as a linear encode, but a quicker encode time. In certain embodiments, content manager 106 that implements overlapped segment allows for the parallel encoding a complex section of a video file (e.g., stream) even when a chunk boundary is located within the complex section of the video.

FIG. 2 is a block diagram depicting an illustrative configuration 200 of a content manager 106 with parallel video encoders 204_0 to 204_N to implement the content delivery system 102 of FIG. 1 according to some embodiments. Configuration 200 includes a video splitter 202 to receive an input of a video file to be encoded and split the single video file (e.g., a movie) into segments (e.g., chunks). The request for the file may be generated by a client's use of the client device 120, such as by launching or interacting with an application for viewing streaming content, a web browser application, etc. The request may indicate at least a main content desired by the client, such as a television program, movie, video, etc.

In one embodiment, the video file is repeatedly split into a number of chunks less than all of the chunks in the video file, e.g., the number of chunks split at each instance of splitting being the same as the number of parallel video encoders 204_0 to 204_N that are used, where N is any positive integer. In one embodiment, 2, 3, 4, 5, 6, 7, 8, 9, 10, 12, 24, 36, 48, 100, 1000, 10000, or any proper subset thereof (e.g., 10-24) of parallel encoders are utilized. As one example, video splitter 202 splits a first portion of the video file into N number of chunks and a second portion of the video file awaits splitting, e.g., waits until the encoding has consumed the first portion of N number of chunks, and repeats this for each additional portion of the video file until the entire video file is encoded.

Content manager 106 provides a first chunk of the video file to first video encoder 204_0, a second chunk of the video file to second video encoder 204_1, and further chunks of the video file to other video encoders 204_N as are utilized. Content manager 106 that implements overlapped segment encoding is also to supply one or more frames (e.g., less than an entire chunk) from before and/or after a chunk to a video encoder (e.g., a lookahead component thereof) that is to encode at least one chunk. Depicted parallel encoders 204_0 to 204_N each include a respective lookahead 208_0 to 208_N to determine at least one rate control state element for the overlapping sections. In one embodiment, each lookahead 208_0 to 208_N is a component of the depicted video encoder instance 204_0 to 204_N, respectively, and performs a lookahead process discussed herein (e.g., but does not perform encoding).

Depicted parallel encoders 204_0 to 204_N each include a respective state history buffer 206_0 to 206_N to store at least one rate control state element that is determined for the overlapping sections. In certain embodiments, the at least one rate control state element is generated by and utilized in a single encoder and is not shared with any of the other encoders. As discussed in further detail in reference to FIGS. 3-5 below, each specific encoder (e.g., lookahead component thereof) is to determine at least one rate control state element for the overlapping segment(s) that it is provided. In one embodiment, each of parallel video encoders 204_0 to 204_N is implemented by a respective processing element of a processor (e.g., a graphics processor).

Content manager 106 implemented in FIG. 2 includes a rate controller 216 to control the rate (e.g., and quality) of the encoding. Rate controller 216 may determine the rate (e.g., variable bit rate (VBR)) of encoding of each chunk based on the network 212 (e.g., network bandwidth and/or quality) and/or status (e.g., available space) in buffer 122. In one embodiment, rate controller 216 adjusts the rate (e.g., below a maximum bitrate) of encoded data being produced by each encoder 204_0 to 204_N during encoding, e.g., so the selected bit rates do not cause an overflow of the buffer 122 of the client device 120. In one embodiment, the VBR is the amount of output data per time segment.

In certain embodiments, first video encoder 204_0 receives a first chunk of a video file (such that no previous frames are available in the video file) and begins encoding the first chunk, second video encoder 204_0 receives a second chunk of the video file (along with previous frame or frames from the first chunk and/or following frame or frames from a third chunk from the video file). Additionally, another video encoder or encoders (e.g., illustrated logically as encoder 204_N) receives a respective, next chunk of the video file (along with previous frame or frames from the previous chunk and/or following frame of frames from a following chunk from the video file).

In an embodiment where the previous frame(s) from the first chunk are provided to the second video encoder 204_1, the lookahead 208_1 determines at least one rate control state element and stores the at least one rate control state element into state history buffer 206_1 (and not any of the other state history buffers). Second video encoder 204_1 may then begin encoding the second chunk (e.g., but not encoding the previous frames from the first chunk). In one embodiment, a lookahead sees about 2-3 seconds ahead in video time of frames, e.g., one group of pictures (GOP). Once each chunk (e.g., each previous, in video order, chunk) is encoded, those encoded chunks are stitched together in video order by the video assembler 210 in the depicted embodiment. Depicted video assembler 210 outputs the stream of encoded video chunks to the buffer 122 of client device 120 by network 212. In one embodiment, network 212 includes a local network and/or an intermediate network. Optionally, buffer 122 is included in decoder 214 of client device. In one embodiment, decoder 214 sends status of buffer 122 over network 212 to rate controller 216. In one embodiment, the video assembler 210 is not deleting or otherwise modifying any of the encoded chunks provided by each of the parallel video encoders 204_0 to 204_N.

Figure 3:
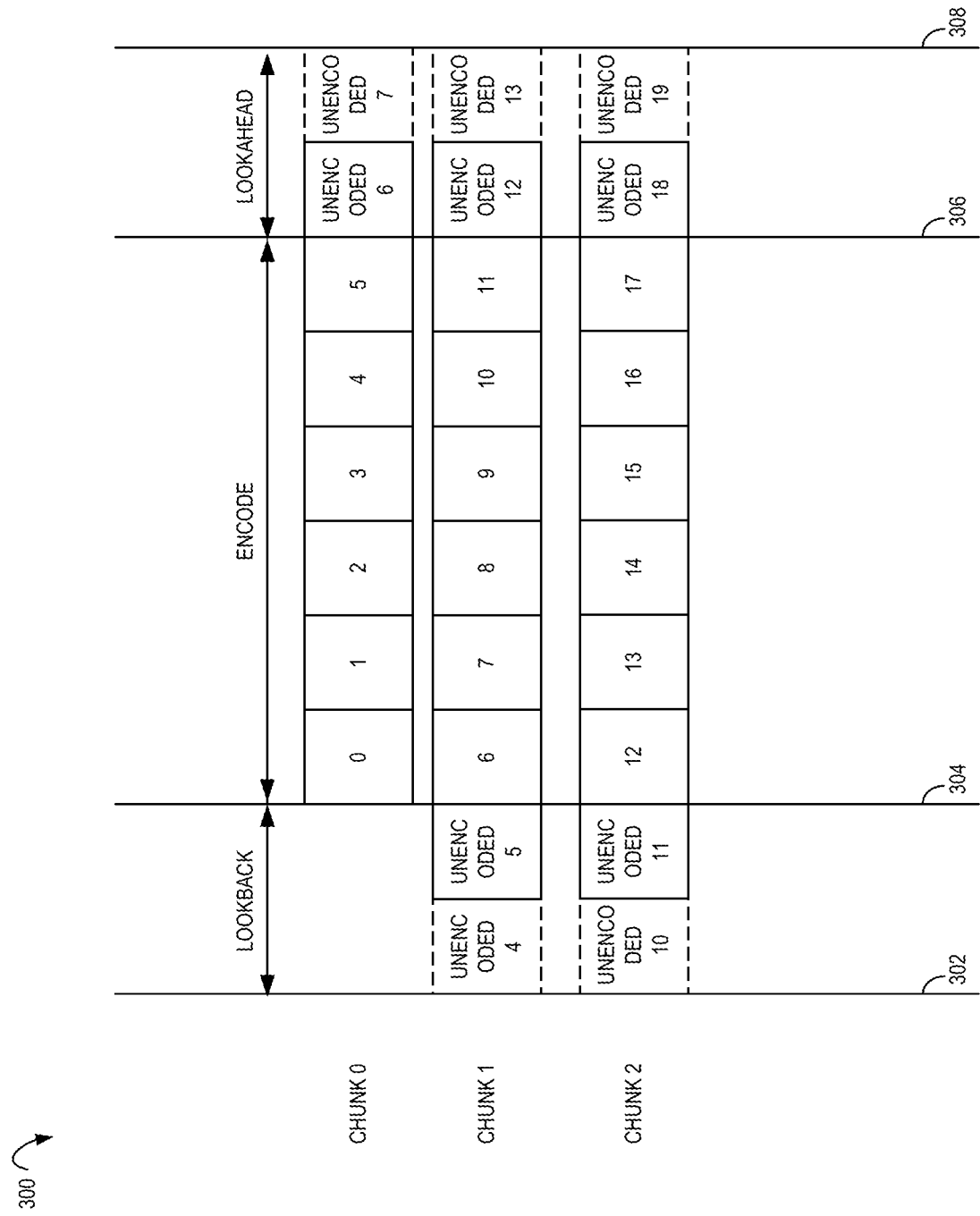
FIG. 3 is a block diagram depicting encoded frames and unencoded frames of a video file split into three chunks produced by the parallel encoding of frames 0-5, frames 6-11, and frames 12-17 with lookback and lookahead according to some embodiments.

FIG. 3 is a block diagram 300 depicting encoded frames and unencoded frames of a video file split into three chunks produced by the parallel encoding of frames 0-5, frames 6-11, and frames 12-17 with lookback and lookahead according to some embodiments. In one embodiment, content manager 106 (e.g., video splitter 202) splits a first portion in a first chunk (chunk 0) of frames 0-5, a second chunk (chunk 1) of frames 6-11, and a third chunk (chunk 2) of frames 12-17. Note that the number of chunks and frames are examples, and it is understood that a content manager (e.g., in software and/or hardware) that implements overlapped segment encoding may operate on any number of chunks in parallel and with any number of frames in a chunk.

Content manager 106 that implements overlapped segment encoding may also supply one or more of (e.g., any combination of) the following: one or more frames (e.g., frame 6 or frames 6 and 7) from after chunk 0 to its encoding instance (e.g., lookahead 208_0), one or more frames (e.g., frame 5 or frames 4 and 5) from before chunk 1 to its encoding instance (e.g., lookahead 208_1), one or more frames (e.g., frame 12 or frames 12 and 13) from after chunk 1 to its encoding instance (e.g., lookahead 208_1), one or more frames (e.g., frame 10 or frames 10 and 11) from before chunk 2 to its encoding instance (e.g., lookahead 208_N), or one or more frames (e.g., frame 18 or frames 18 and 19) from after chunk 2 to its encoding instance (e.g., lookahead 208_N). In one embodiment, lookahead process occurs before (e.g., one or two frames) encoding of the chunk being looked ahead from. In one embodiment, determining at least one rate control state element for a lookback process occurs before the encoding of the chunk being looked back from.

In certain embodiments, a first parallel encoding instance (e.g., first video encoder 204_0) is to perform the encode of frames 0-5 of chunk 0, and the encode of those frames (e.g., frame 5 thereof) is encoded based on at least one state element determined from the lookahead process being performed on frame 6 or frames 6 and 7. In certain embodiments, a second parallel encoding instance (e.g., second video encoder 204_1) is to perform the encode of frames 6-11 of chunk 1, and the encode of those frames (e.g., frame 11 thereof) is encoded based on at least one state element determined from the lookahead process being performed on frame 12 or frames 12 and 13. In certain embodiments, a third parallel encoding instance (e.g., third video encoder 204_N) is to perform the encode of frames 12-17 of chunk 2, and the encode of those frames (e.g., frame 17 thereof) is encoded based on at least one state element determined from the lookahead process being performed on frame 18 or frames 18 and 19. Frame 0 may be the start of a video file or may be another frame of the video file.

In certain embodiments, a second parallel encoding instance (e.g., second video encoder 204_1) is to perform the encode of frames 6-11 of chunk 1, and the encode of those frames (e.g., frame 6 thereof) is encoded based on at least one state element determined from the lookback process being performed (e.g., a lookahead performed before the encoding is performed) on frame 4 or frames 4 and 5. In certain embodiments, a third parallel encoding instance (e.g., third video encoder 204_N) is to perform the encode of frames 12-17 of chunk 2, and the encode of those frames (e.g., frame 12 thereof) is encoded based on at least one state element determined from the lookback process being performed (e.g., a lookahead performed before the encoding is performed) on frame 10 or frames 10 and 11.

Although the term lookback is used herein, in general it may reference a section (e.g., one or more frames) of a video file that is before a chunk, for example, lookback of chunk 1 in FIG. 3 includes frames 4 and 5 from chunk 0.

In one embodiment, line 302 indicates a first time ($t_0$) where the determining of at least one rate control state element from a lookback process begins being performed (e.g., a lookahead performed before the encoding is performed) for all chunks except the beginning chunk of a video file, line 304 indicates a second time ($t_1$) where the determining of at least one rate control state element ends and the encoding process begins for each of the three chunks (e.g., using their respective state element from a lookback), line 306 indicates a third time ($t_2$) where the encoding process ends for each of the three chunks (e.g., using their respective state element from a lookahead), and line 308 indicates a fourth time ($t_3$) where the determining process ends for each of the three chunks to produce their respective state element from a lookahead. In one embodiment, the fourth time occurs before the third time in chronological order and FIG. 3 illustrates logically which frames of a chunk are encoded and which are not in an example of overlapped segment encoding. In certain embodiments, encoding of a first frame takes a first time period and parallel encoding of a second frame take a second, different time period.

Figure 4:
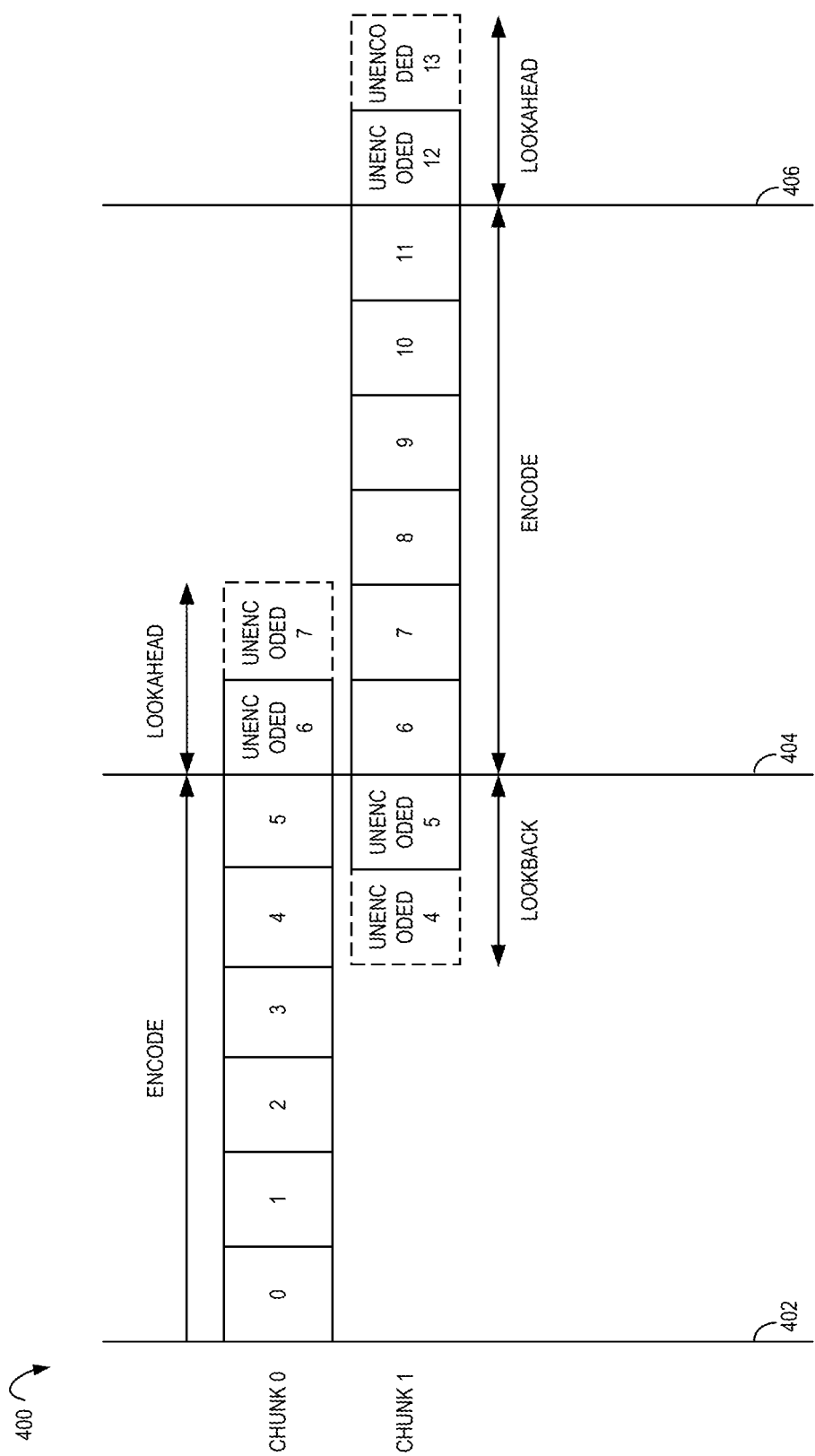
FIG. 4 is a block diagram depicting encoded frames and unencoded frames of a video file split into two chunks in the video order the encoded frames are to be combined to form an encoded video file according to some embodiments.

FIG. 4 is a block diagram 400 depicting encoded frames and unencoded frames of a video file split into two chunks in the video order the encoded frames are to be combined to form an encoded video file according to some embodiments. In time, frame 0 of chunk 0 and frame 6 are encoded simultaneously (e.g., begin encoding at the same time).

In one embodiment, content manager 106 (e.g., video splitter 202) splits a first portion in a first chunk (chunk 0) of frames 0-5, and a second chunk (chunk 1) of frames 6-11. Note that the number of chunks and frames are examples, and it is understood that a content manager (e.g., in software and/or hardware) that implements overlapped segment encoding may operate on any number of chunks in parallel and with any number of frames in a chunk.

Content manager 106 that implements overlapped segment encoding may also supply one or more of (e.g., any combination of) the following: one or more frames (e.g., frame 6 or frames 6 and 7) from after chunk 0 to its encoding instance (e.g., lookahead 208_0), one or more frames (e.g., frame 5 or frames 4 and 5) from before chunk 1 to its encoding instance (e.g., lookahead 208_1), or one or more frames (e.g., frame 12 or frames 12 and 13) from after chunk 1 to its encoding instance (e.g., lookahead 208_1). In one embodiment, lookahead process occurs before (e.g., one or two frames) encoding of the chunk being looked ahead from. In one embodiment, determining at least one rate control state element for a lookback process occurs before the encoding of the chunk being looked back from.

In certain embodiments, a first parallel encoding instance (e.g., first video encoder 204_0) is to perform the encode of frames 0-5 of chunk 0, and the encode of those frames (e.g., frame 5 thereof) is encoded based on at least one state element determined from the lookahead process being performed on frame 6 or frames 6 and 7. In certain embodiments, a second parallel encoding instance (e.g., second video encoder 204_1) is to perform the encode of frames 6-11 of chunk 1, and the encode of those frames (e.g., frame 11 thereof) is encoded based on at least one state element determined from the lookahead process being performed on frame 12 or frames 12 and 13.

In certain embodiments, a second parallel encoding instance (e.g., second video encoder 204_1) is to perform the encode of frames 6-11 of chunk 1, and the encode of those frames (e.g., frame 6 thereof) is encoded based on at least one state element determined from the lookback process being performed (e.g., a lookahead performed before the encoding is performed) on frame 4 or frames 4 and 5.

Although the term lookback is used herein, in general it may reference a section (e.g., one or more frames) of a video file that is before a chunk, for example, lookback of chunk 1 in FIG. 4 includes frames 4 and 5 from chunk 0.

In one embodiment, line 402 indicates a first time ($t_0$) in the unencoded and encoded video file where frame 0 begins, line 404 indicates a second time ($t_1$) in the unencoded and encoded video file where frame 5 ends and frame 6 begins, and line 406 indicates a third time ($t_2$) in the unencoded and encoded video file where frame 11 ends. FIG. 4 illustrates that in the depicted embodiment, the unencoded lookahead frames 6 and 7 supplied during the encode of chunk 0, the unencoded lookback frames 4 and 5 supplied during the encode of chunk 1, and the unencoded frames 12 and 13 supplied during the encode of chunk 1 are discarded from use in the encoded file.

Figure 5:
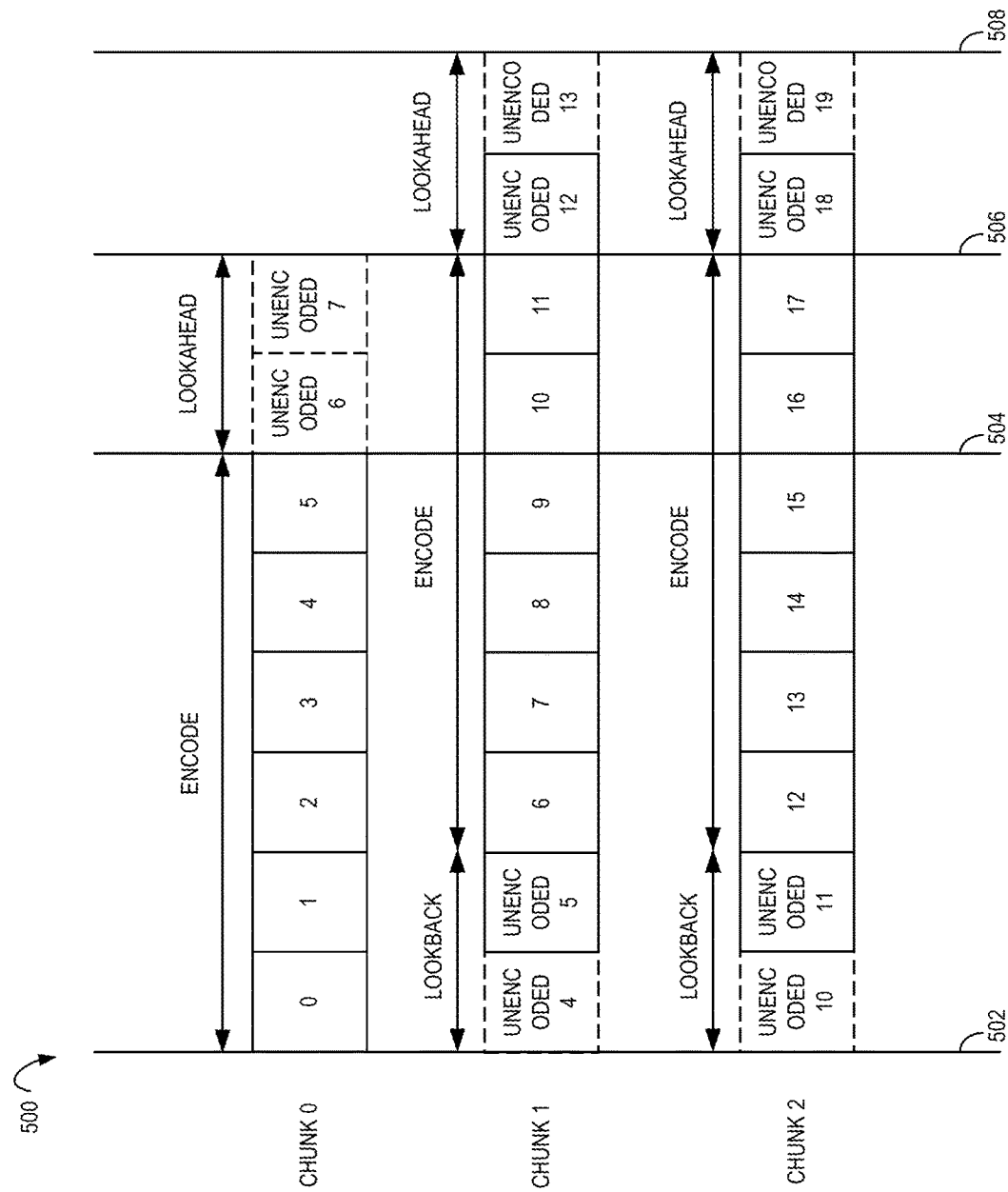
FIG. 5 is a block diagram depicting encoded frames and unencoded frames of a video file split into three chunks produced by the parallel encoding of frames 2-5, frames 6-9, and frames 12-15 with lookback and lookahead according to some embodiments.

FIG. 5 is a block diagram 500 depicting encoded frames and unencoded frames of a video file split into three chunks produced by the parallel encoding of frames 2-5, frames 6-9, and frames 12-15 with lookback and lookahead according to some embodiments. In contrast to FIG. 3, the encoding of chunk 0 of the video file, which includes no previous frames in the video file, begins concurrently with the lookback for chunk 1 and the lookback from chunk 2.

In one embodiment, content manager 106 (e.g., video splitter 202) splits a first portion in a first chunk (chunk 0) of frames 0-5, a second chunk (chunk 1) of frames 6-11, and a third chunk (chunk 2) of frames 12-17. Note that the number of chunks and frames are examples, and it is understood that a content manager (e.g., in software and/or hardware) that implements overlapped segment encoding may operate on any number of chunks in parallel and with any number of frames in a chunk.

Content manager 106 that implements overlapped segment encoding may also supply one or more of (e.g., any combination of) the following: one or more frames (e.g., frame 6 or frames 6 and 7) from after chunk 0 to its encoding instance (e.g., lookahead 208_0), one or more frames (e.g., frame 5 or frames 4 and 5) from before chunk 1 to its encoding instance (e.g., lookahead 208_1), one or more frames (e.g., frame 12 or frames 12 and 13) from after chunk 1 to its encoding instance (e.g., lookahead 208_1), one or more frames (e.g., frame 10 or frames 10 and 11) from before chunk 2 to its encoding instance (e.g., lookahead 208_N), or one or more frames (e.g., frame 18 or frames 18 and 19) from after chunk 2 to its encoding instance (e.g., lookahead 208_N). In one embodiment, lookahead process occurs before (e.g., one or two frames) encoding of the chunk being looked ahead from. In one embodiment, determining at least one rate control state element for a lookback process occurs before the encoding of the chunk being looked back from, but does not stall the encoding of any other chunks that have (or do not utilize) their rate control state element(s).

In certain embodiments, a first parallel encoding instance (e.g., first video encoder 204_0) is to perform the encode of frames 0-5 of chunk 0, and the encode of those frames (e.g., frame 5 thereof) is encoded based on at least one state element determined from the lookahead process being performed on frame 6 or frames 6 and 7. In certain embodiments, a second parallel encoding instance (e.g., second video encoder 204_1) is to perform the encode of frames 6-11 of chunk 1, and the encode of those frames (e.g., frame 11 thereof) is encoded based on at least one state element determined from the lookahead process being performed on frame 12 or frames 12 and 13. In certain embodiments, a third parallel encoding instance (e.g., third video encoder 204_N) is to perform the encode of frames 12-17 of chunk 2, and the encode of those frames (e.g., frame 17 thereof) is encoded based on at least one state element determined from the lookahead process being performed on frame 18 or frames 18 and 19.

In certain embodiments, a second parallel encoding instance (e.g., second video encoder 204_1) is to perform the encode of frames 6-11 of chunk 1, and the encode of those frames (e.g., frame 6 thereof) is encoded based on at least one state element determined from the lookback process being performed (e.g., a lookahead performed before the encoding is performed) on frame 4 or frames 4 and 5. In certain embodiments, a third parallel encoding instance (e.g., third video encoder 204_N) is to perform the encode of frames 12-17 of chunk 2, and the encode of those frames (e.g., frame 12 thereof) is encoded based on at least one state element determined from the lookback process being performed (e.g., a lookahead performed before the encoding is performed) on frame 10 or frames 10 and 11.

Although the term lookback is used herein, in general it may reference a section (e.g., one or more frames) of a video file that is before a chunk, for example, lookback of chunk 1 in FIG. 3 includes frames 4 and 5 from chunk 0.

In one embodiment, line 502 indicates a first time ($t_0$) where the determining of at least one rate control state element from a lookback process begins being performed (e.g., a lookahead performed before the encoding is performed) for all chunks except the beginning chunk of a video file, and encoding of the first frame of chunk 0 begins, line 504 indicates a second time ($t_1$) where the encoding of the first frame of chunk 0 ends and the encoding of frame 10 of chunk 1 and the encoding of frame 16 of chunk 2 begins, line 506 indicates a third time ($t_2$) where the determining process ends for the first chunk (chunk 0) to produce its respective state element from a lookahead, and the encoding of chunk 1 and chunk 2 ends, and line 508 indicates a fourth time ($t_3$) where the determining process ends for the second chunk (chunk 1) and the third chunk (chunk 2) to produce their respective state elements from their lookahead.

In one embodiment, the fourth time occurs before the third time in chronological order and FIG. 5 illustrates logically which frames of a chunk are encoded and which are not in an example of overlapped segment encoding. In certain embodiments, encoding of a first frame takes a first time period and parallel encoding of a second frame take a second, different time period.

Figure 6A:
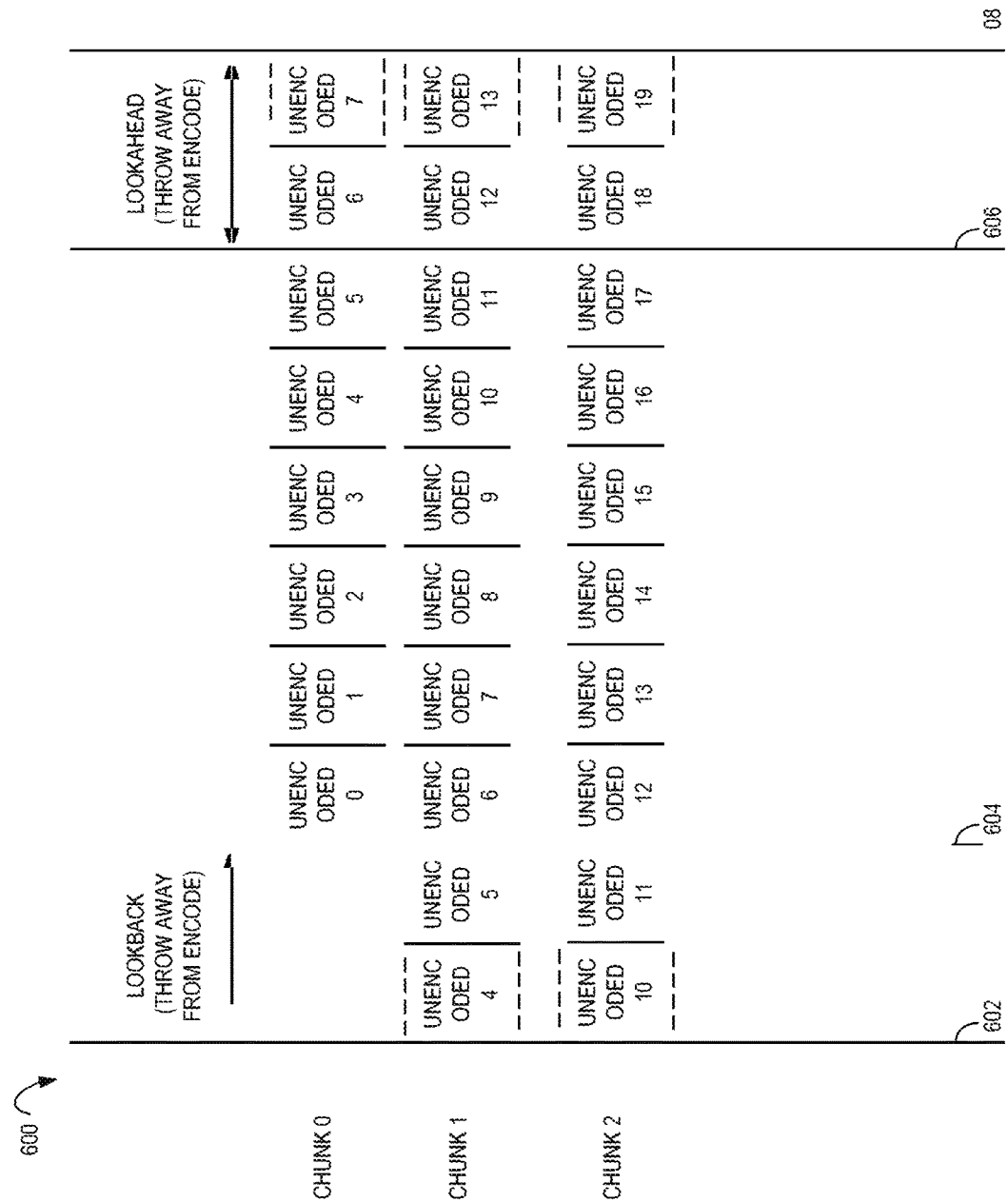
FIG. 6A is a block diagram depicting an input of unencoded frames of a video file split into three chunks for parallel encoding according to some embodiments.
Figure 6B:
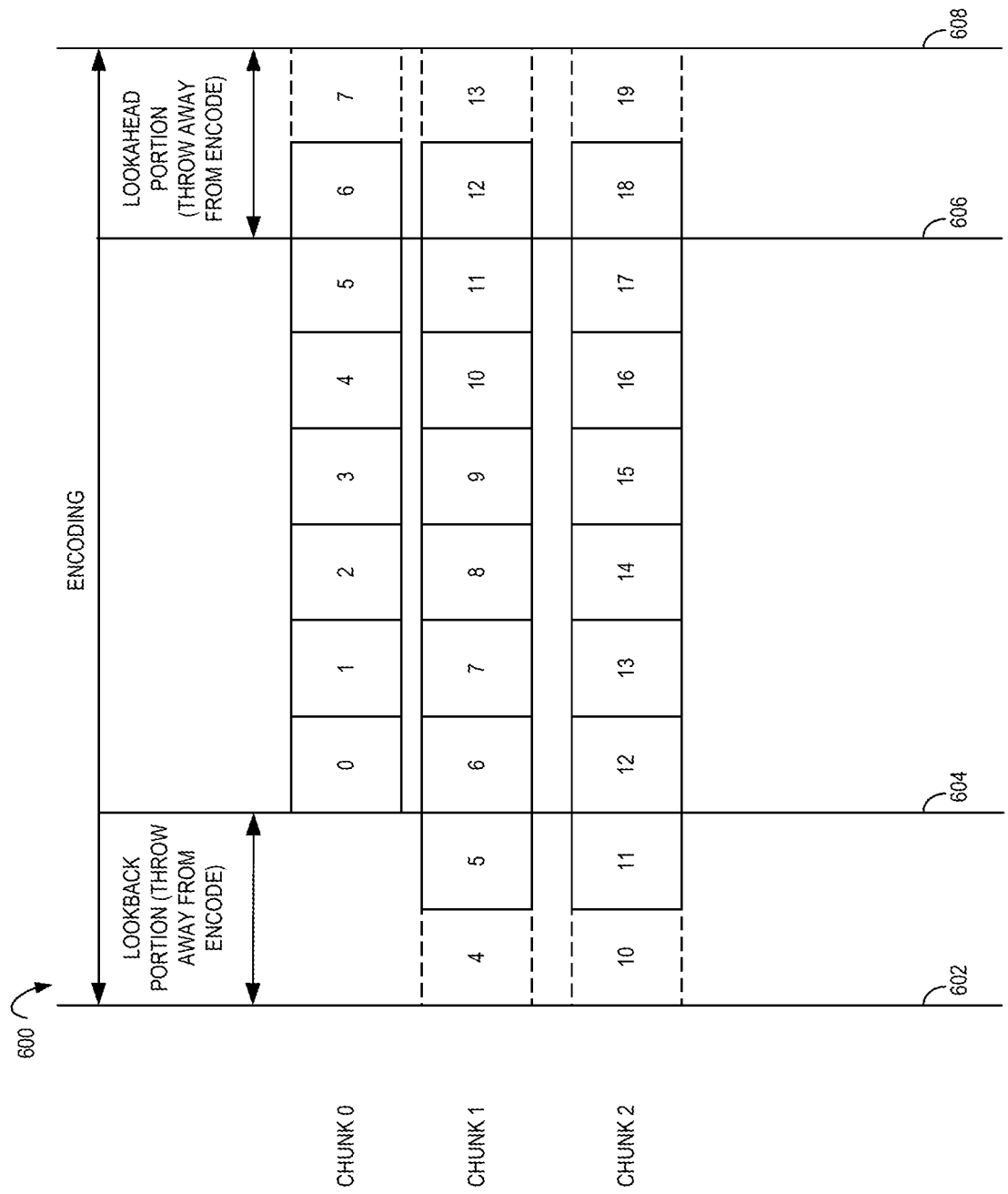
FIG. 6B is a block diagram depicting the encoded frames produced by parallel encoding of the video file split into three chunks of FIG. 6A according to some embodiments.
Figure 6C:
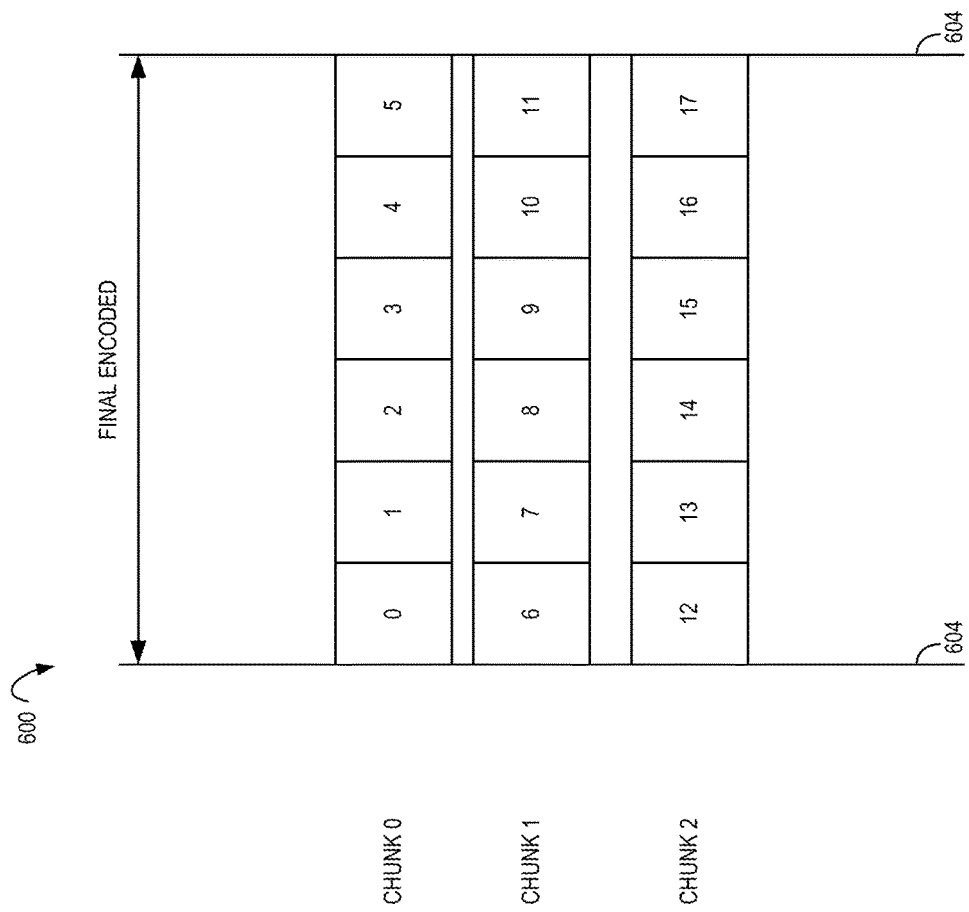
FIG. 6C is a block diagram depicting the encoded frames from FIG. 6B that will be assembled together to form the encoded video file according to some embodiments.

FIGS. 6A-6C discuss an embodiment with full encoding of the overlapped segments, but discarding of certain of the segments from being in the encoded video file. FIG. 6A is a block diagram 600 depicting an input of unencoded frames of a video file split into three chunks for parallel encoding according to some embodiments. In certain embodiments, instead of determining respective state elements from their lookahead and their lookback processes, the overlapping segments have a (e.g., full) encode performed and the extra encoded information is then deleted. FIG. 6A illustrates that on splitting of a first portion of a video file into a first chunk (chunk 0) of frames 0-5, a second chunk (chunk 1) of frames 6-11, and a third chunk (chunk 2) of frames 12-17

Content manager 106 that implements overlapped segment encoding may also supply one or more of (e.g., any combination of) the following: one or more frames (e.g., frame 6 or frames 6 and 7) from after chunk 0 to its encoding instance (e.g., video encoder 204_0), one or more frames (e.g., frame 5 or frames 4 and 5) from before chunk 1 to its encoding instance (e.g., video encoder 204_1), one or more frames (e.g., frame 12 or frames 12 and 13) from after chunk 1 to its encoding instance (e.g., video encoder 204_1), one or more frames (e.g., frame 10 or frames 10 and 11) from before chunk 2 to its encoding instance (e.g., video encoder 204_N), or one or more frames (e.g., frame 18 or frames 18 and 19) from after chunk 2 to its encoding instance (e.g., video encoder 204_N). In one embodiment, determining at least one rate control state element by an encoding process for a frame from outside of the chunk occurs before the output of the encoded chunk.

In certain embodiments, a first parallel encoding instance (e.g., first video encoder 204_0) is to perform the encode of frames 0-5 of chunk 0, and the encode of those frames (e.g., frame 5 thereof) is encoded based on at least one state element determined from the encoding process being performed on frame 6 or frames 6 and 7. In certain embodiments, a second parallel encoding instance (e.g., second video encoder 204_1) is to perform the encode of frames 6-11 of chunk 1, and the encode of those frames (e.g., frame 11 thereof) is encoded based on at least one state element determined from the encoding process being performed on frame 12 or frames 12 and 13. In certain embodiments, a third parallel encoding instance (e.g., third video encoder 204_N) is to perform the encode of frames 12-17 of chunk 2, and the encode of those frames (e.g., frame 17 thereof) is encoded based on at least one state element determined from the encoding process being performed on frame 18 or frames 18 and 19.

In certain embodiments, a second parallel encoding instance (e.g., second video encoder 204_1) is to perform the encode of frames 6-11 of chunk 1, and the encode of those frames (e.g., frame 6 thereof) is encoded based on at least one state element determined from the encoding process being performed on frame 4 or frames 4 and 5. In certain embodiments, a third parallel encoding instance (e.g., third video encoder 204_N) is to perform the encode of frames 12-17 of chunk 2, and the encode of those frames (e.g., frame 12 thereof) is encoded based on at least one state element determined from the encoding process being performed on frame 10 or frames 10 and 11.

In one embodiment, line 602 to line 604 illustrates the lookback section of encoded data is to be thrown away, e.g., after using the at least one state element determined from that encoding process on the chunk that is to be output as the encoded chunk, line 604 to line 606 illustrates the chunks that are to be output as the encoded chunks, and line 606 to line 608 illustrates the lookahead section of encoded data is to be thrown away, e.g., after using the at least one state element determined from that encoding process on the chunk that is to be output as the encoded chunk.

FIG. 6B is a block diagram 600 depicting the encoded frames from line 602 to line 608 produced by parallel encoding of the video file split into three chunks of FIG. 6A according to some embodiments.

FIG. 6C is a block diagram 600 depicting the encoded frames from FIG. 6B that will be assembled together to form the encoded video file according to some embodiments. Particularly, the encoded frames from line 604 to line 606 are to be output as the encoded chunks, e.g., and then assembled back together by a video assembler.

Figure 7A:
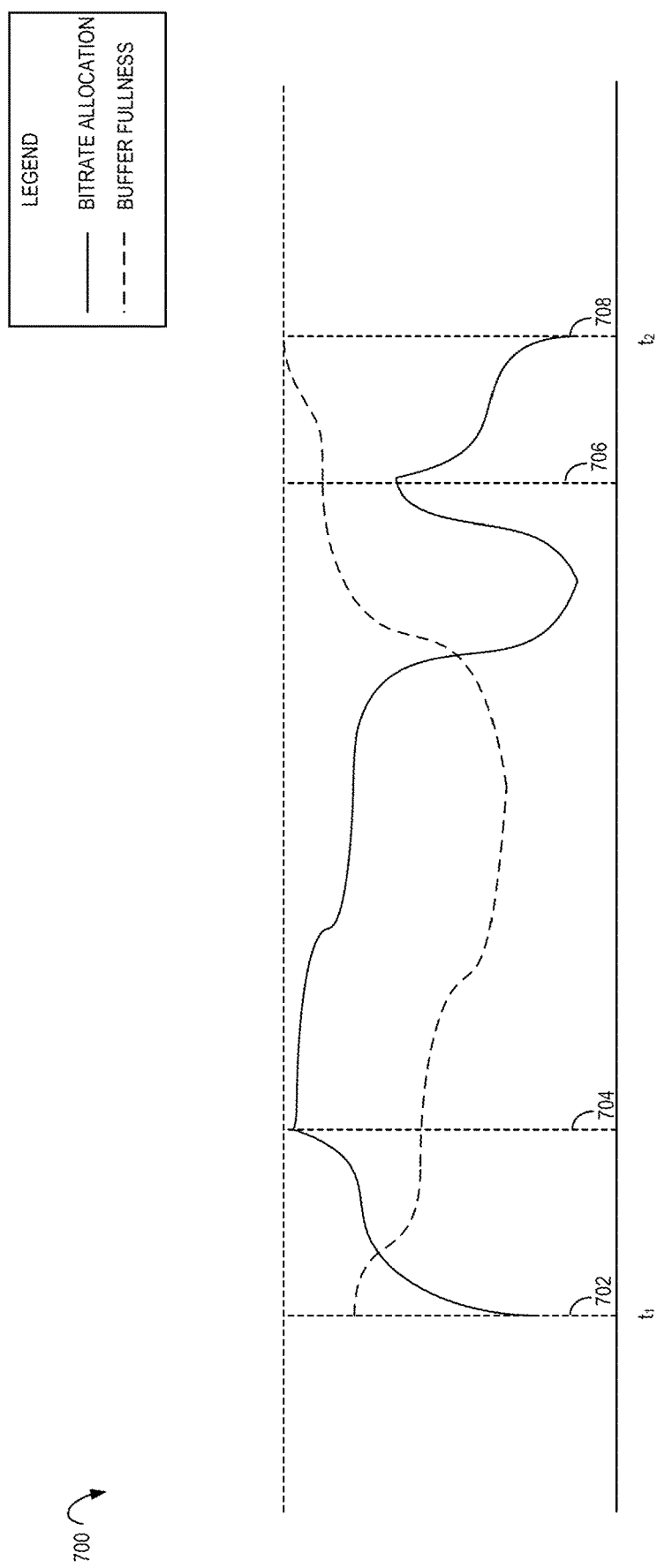
FIG. 7A is a graph of bitrate allocation versus time and a graph of buffer fullness of a client device versus time for a chunk of a video file without any rate control state element for a previous frame or a following frame according to some embodiments.

FIG. 7A is a graph 700 of bitrate allocation versus time and a graph of buffer fullness of a client device versus time for a chunk of a video file without any rate control state element for a previous frame or a following frame according to some embodiments of encoding.

Figure 7B:
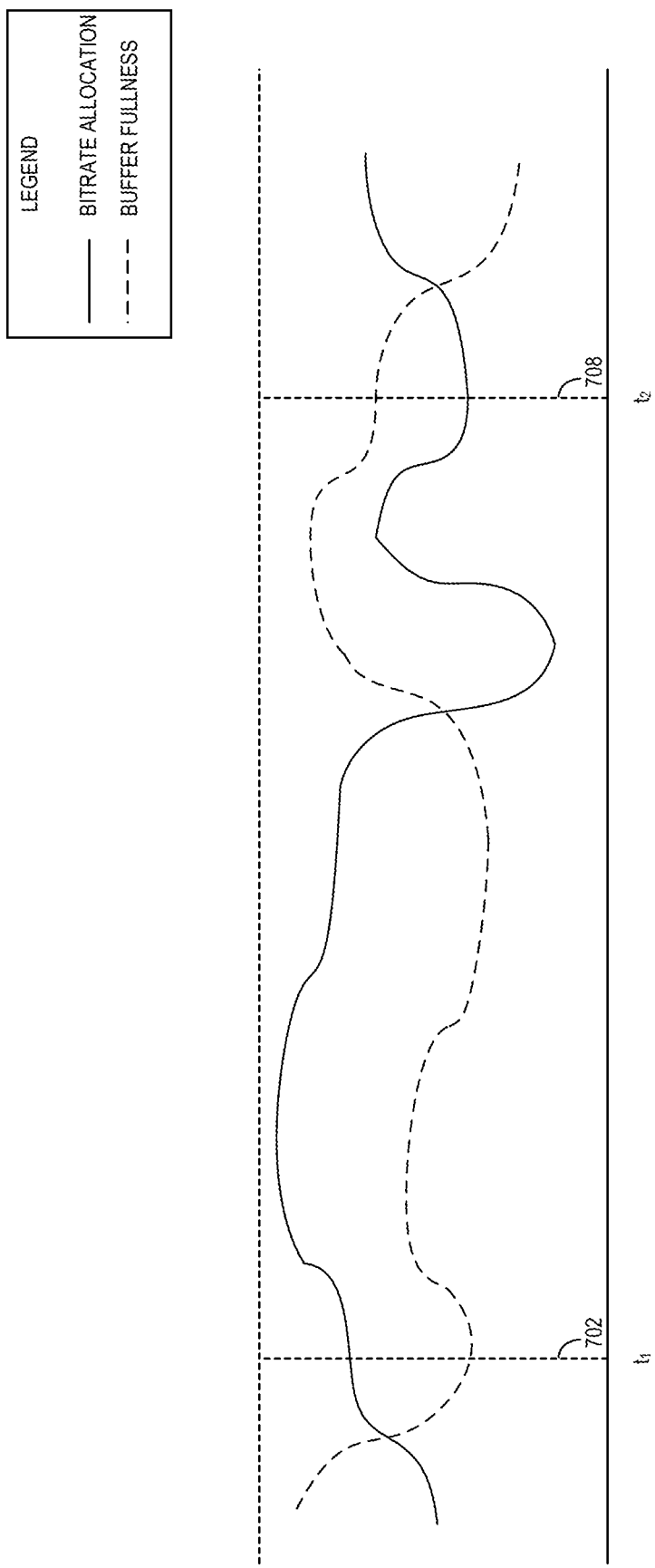
FIG. 7B is a graph of bitrate allocation versus time and a graph of buffer fullness of a client device versus time for the chunk of the video file in FIG. 7A with a rate control state element for a previous frame and a following frame determined with overlapped segment encoding according to some embodiments.

FIG. 7B is a graph 701 of bitrate allocation versus time and a graph of buffer fullness of a client device versus time for the chunk of the video file in FIG. 7A with a rate control state element for a previous frame and a following frame determined with overlapped segment encoding according to some embodiments of encoding.

In FIGS. 7A-7B, the x-axis illustrates time of the video file, and the y-axis illustrates buffer (e.g., buffer 122) fullness and bitrate allocation for each respective graph for the same video chunk. In one embodiment, line 702 illustrates the beginning ($t_1$) of a chunk of a video file and line 708 illustrates the end ($t_2$) of the chunk of the video vile. As one example, the chunk size (e.g., time between lines 702 and 708) is about 60 seconds.

In FIG. 7A, there is no history from the immediately prior chunk (e.g., no rate control state element), so buffer fullness is initialized to a preset fixed value. Thus, the frame budget plan is an estimate, and after the passage of time (e.g., a few frames), it stabilizes during encoding at the time indicated by line 704 to a desired value shown in FIG. 7B. Similarly, at the time indicated by line 706 before the t2 point of line 708, a lookahead during encoding does not have any future frames to evaluate for complexity, so the bit budget plans start to vary toward the end away from the desired value shown in FIG. 7B.

In FIG. 7B, respective rate control state element(s) for a previous frame before the beginning ($t_1$) of a chunk of a video file at line 702 and a following frame after the end ($t_2$) of the chunk of the video file at line 708 are determined according to the overlapped segment encoding discussed herein. Thus, the buffer fullness level is determined by what came before line 702 and immediately after the end of the chunk at line 708, such the complexity of what is coming before the beginning ($t_1$) and after end ($t_2$) of the chunk affects bit budget planning.

Figure 8:
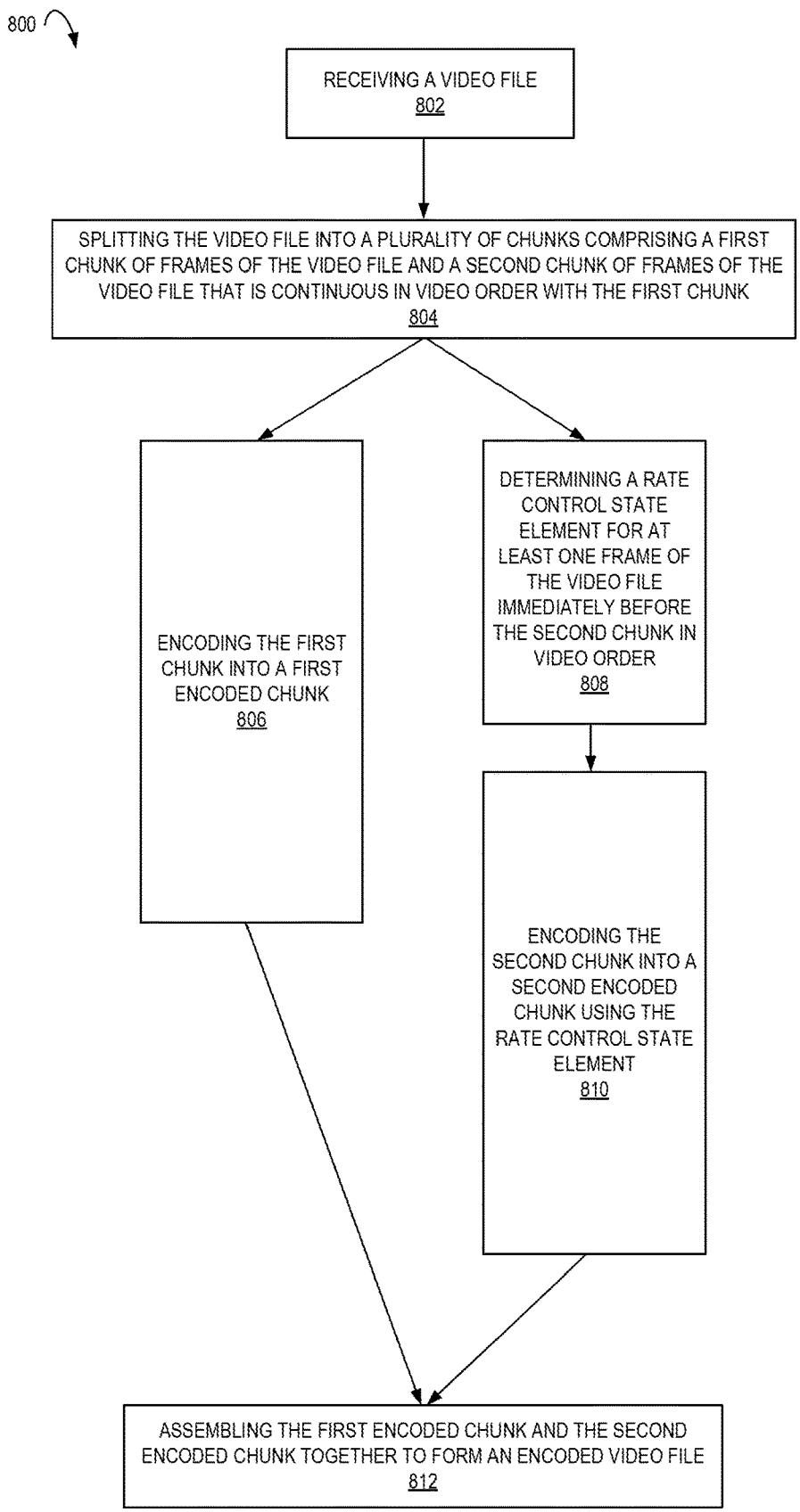
FIG. 8 is a flow diagram illustrating operations of a method for splitting a video file, determining a rate control state element, encoding the video file, and assembling an encoded video file according to some embodiments.

FIG. 8 is a flow diagram 800 illustrating operations of a method for splitting a video file, determining a rate control state element, encoding the video file, and assembling an encoded video file according to some embodiments. Depicted flow diagram 800 includes receiving a video file 802; splitting the video file into a plurality of chunks comprising a first chunk of frames of the video file and a second chunk of frames of the video file that is continuous in video order with the first chunk 804; and, in parallel, (i) encoding the first chunk into a first encoded chunk 806 and (ii) determining a rate control state element for at least one frame of the video file immediately before the second chunk in video order 808 and/or encoding the second chunk into a second encoded chunk using the rate control state element 810; and assembling the first encoded chunk and the second encoded chunk together to form an encoded video file 812. The assembled, encoded video file may then be transmitted (e.g., streamed in packets or other sections) to a requesting client device.

Figure 9:
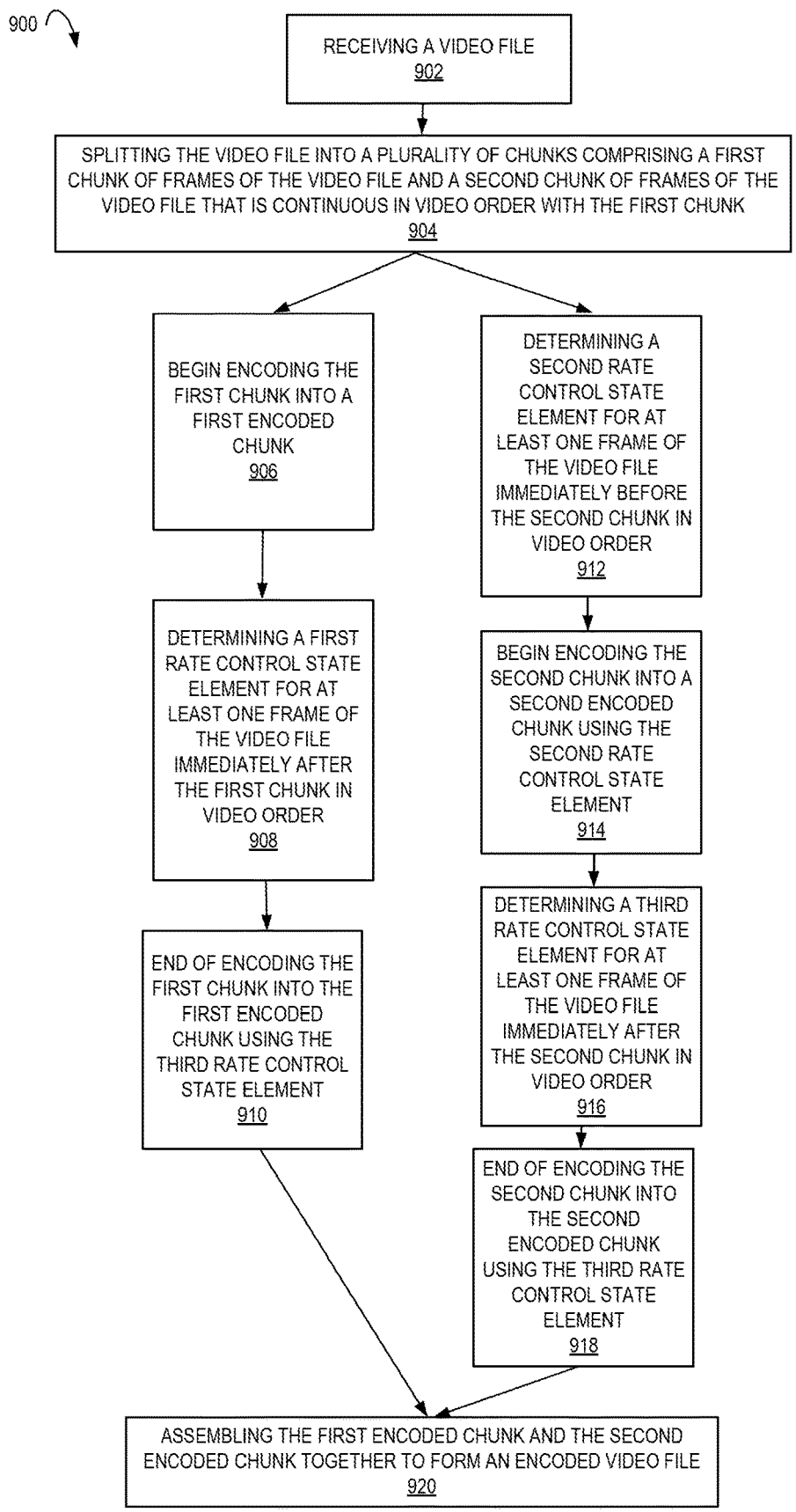
FIG. 9 is a flow diagram illustrating operations of a method for splitting a video file, determining a first rate control state element, a second rate control state element, and a third rate control state element, encoding the video file, and assembling an encoded video file according to some embodiments.

FIG. 9 is a flow diagram 900 illustrating operations of a method for splitting a video file, determining a first rate control state element, a second rate control state element, and a third rate control state element, encoding the video file, and assembling an encoded video file according to some embodiments. Depicted flow diagram 900 includes receiving a video file 902; splitting the video file into a plurality of chunks comprising a first chunk of frames of the video file and a second chunk of frames of the video file that is continuous in video order with the first chunk 904; and, in parallel, (i) begin encoding the first chunk into a first encoded chunk 906, Determining a first rate control state element for at least one frame of the video file immediately after the first chunk in video order 908, and end of encoding the first chunk into the first encoded chunk using the third rate control state element 910, and (ii) determining a second rate control state element for at least one frame of the video file immediately before the second chunk in video order 912, begin encoding the second chunk into a second encoded chunk using the second rate control state element 914, determining a third rate control state element for at least one frame of the video file immediately after the second chunk in video order 916, and end of encoding the second chunk into the second encoded chunk using the third rate control state element 918; and assembling the first encoded chunk and the second encoded chunk together to form an encoded video file 920. The assembled, encoded video file may then be transmitted (e.g., streamed in packets or other sections) to a requesting client device.

In certain embodiments, a (e.g., video) file is a live stream, a partially uploaded ("growing") file, or a sequence of file chunks that are to be assembled into continuous audio visual (A/V) content. In one embodiment, live encoding of a file is performed where, as content comes in that is too complex to encode in real time, a new encoding instance (e.g., encoder) to encode new segments of that content is started (e.g., launched) and completed segments are available for viewing as they are completed (e.g., even though new live content or previously launched encoding instances are still running) In that embodiment, moderate-latency live encoding is achieved with new encoding instance(s) started (e.g., kicked off) to ensure that all uploaded content is being encoded.

Figure 10:
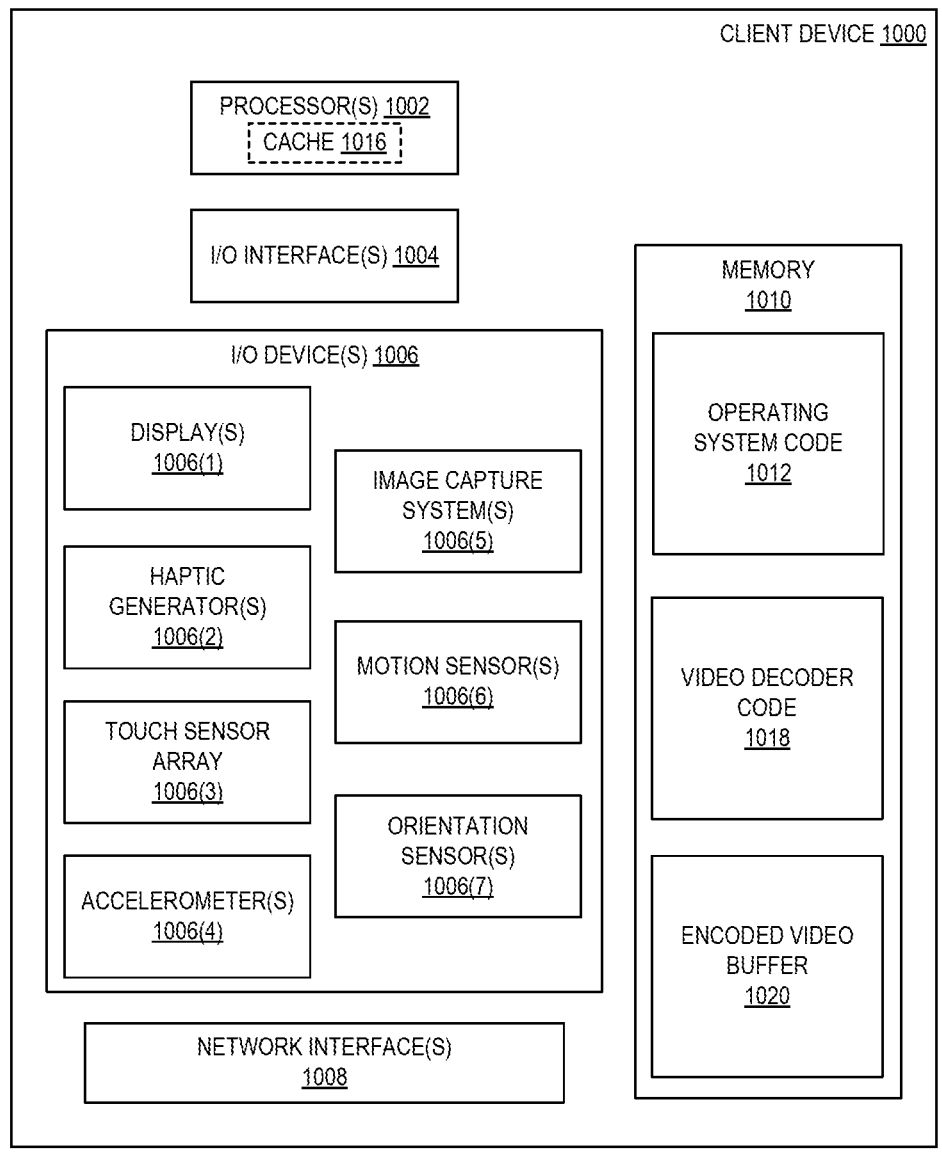
FIG. 10 is a block diagram illustrating an example client device that may be used in some embodiments.

FIG. 10 is a block diagram illustrating an example client device 1000 that may be used in some embodiments. In one embodiment, client device 1000 is client device 120 in FIG. 1 or FIG. 2. Memory 1010 of device 1000 includes video decoder code 1018, that when executed, is to decode an encoded video file received therein, e.g., received in the encoded video buffer 1020 in memory 1010. In one embodiment, processor 1002 includes a cache 1016 that is used to store encoded video data (e.g., chunks), additionally or alternatively to the encoded video buffer 1020 in memory 1010.

Device 1000 includes one or more single or multi-core processors 1002 to execute stored instructions (e.g., in memory 1010), for example, of decoder code that is to decode an encoded video file (e.g., stream) into a format that is playable on display(s) 1006(1) of device 1000. Device 1000 may also include one or more input/output (I/O) interface(s) 1004 to allow the device to communicate with other devices. I/O interfaces 1004 may include, for example, an inter-integrated circuit (I2C) interface, a serial peripheral interface (SPI) bus, a universal serial bus (USB), an RS-232 interface, a media device interface, and so forth. I/O interface(s) 1004 are coupled to one or more I/O devices 1006. The I/O device(s) 1006 may include one or more displays 1006(1) to display the decoded version of an encoded video file, one or more haptic generators 1006(2), a touch sensor array 1006(3), one or more accelerometers 1006(4), one or more image capture systems 1006(5), one or more motion sensors 1006(6), one or more orientation sensors 1006(7), microphones, speakers, etc. The one or more displays 1006 (1) provide visual output to the user and may include any of a variety of display types including, for example, any type of reflective or transmissive display. Touch sensor array 1006(3) may be a capacitive sensor array having a matrix of conductors that are scanned to determine, for example, the location, duration, speed and direction of touch events within the matrix based on changes in electrical capacitance.

Device 1000 also includes one or more communication interfaces 1008 to provide communications between the device and other devices. Such communication interface(s) 1008 may be used to connect to cellular networks, personal area networks (PANs), local area networks (LANs), wide area networks (WANs), and so forth, e.g., to receive data from content delivery system 102. For example, communications interfaces 1008 may include radio frequency circuits for these networks. Device 1000 also includes one or more buses or other internal communications hardware or software that allow for the transfer of data and instructions between the various components of the device.

Device 1000 also includes one or more memories (e.g., memory 1010). Memory 1010 includes non-transitory computer-readable storage media that may be any of a wide variety of types of volatile and non-volatile storage media including, for example, electronic storage media, magnetic storage media, optical storage media, quantum storage media, mechanical storage media, and so forth. Memory 1010 provides storage for computer readable instructions, data structures, program code, and other data for the operation of device 1000. Memory 1010 stores at least one operating system (OS) code 1012 to manage hardware resources such as I/O interfaces 1004 and provide various services to applications or other code executing on processor(s) 1002.

Memory 1010 may store a wide variety of instructions and information using any of a variety of formats including, for example, flat files, databases, linked lists, trees, or other data structures. Such information includes content for rendering and display on display 1006(1) including, for example, any type of video content. In some embodiments, a portion of memory 1010 is distributed across one or more other devices including servers, network attached storage devices, and so forth.

Illustrative System

Figure 11:
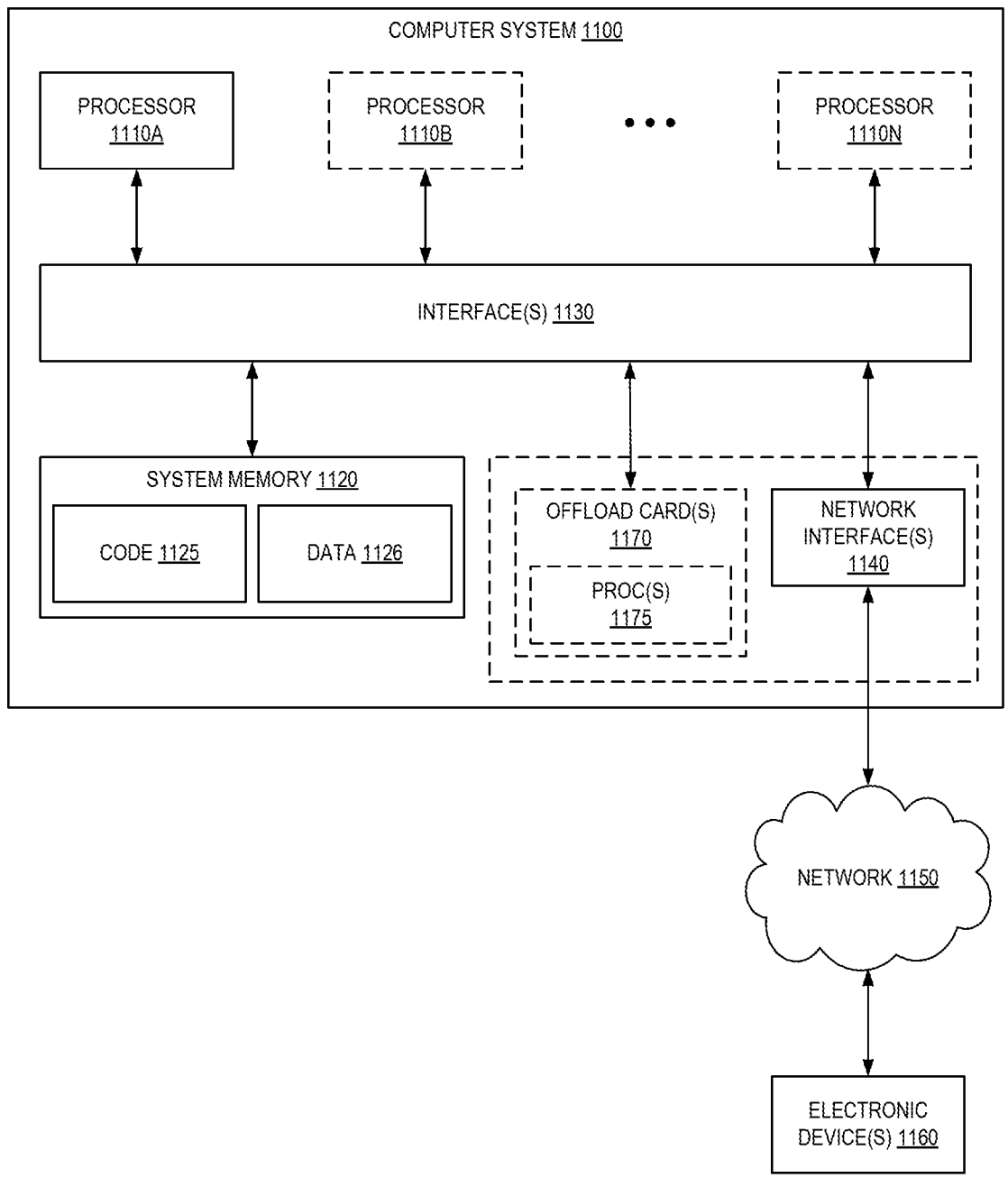
FIG. 11 is a block diagram illustrating an example computer system that may be used in some embodiments.

In some embodiments, a system that implements a portion or all of the techniques for overlapped segment encoding as described herein may include a general-purpose computer system that includes or is programmed to access one or more computer-accessible media, such as computer system 1100 illustrated in FIG. 11.

In the illustrated embodiment, computer system 1100 includes one or more processors 1110 (1110A-1110N) coupled to a system memory 1120 via an input/output (I/O) interface 1130. Computer system 1100 further includes a network interface 1140 coupled to I/O interface 1130. While FIG. 11 shows computer system 1100 as a single computing device, in various embodiments a computer system 1100 may include one computing device or any number of computing devices coupled to work together as a single computer system 1100.

In various embodiments, computer system 1100 may be a uniprocessor system including one processor 1110, or a multiprocessor system including several processors 1110 (e.g., two, four, eight, or another suitable number). Processors 1110 may be any suitable processors capable of executing instructions. For example, in various embodiments, processors 1110 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1110 may commonly, but not necessarily, implement the same ISA.

System memory 1120 may store instructions and data accessible by processor(s) 1110. In various embodiments, system memory 1120 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for overlapped segment encoding are shown stored within system memory 1120 as code 1125 and data 1126.

In one embodiment, I/O interface 1130 may coordinate I/O traffic between processor 1110, system memory 1120, and any peripheral devices in the device, including network interface 1140 or other peripheral interfaces. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may allow data to be exchanged between computer system 1100 and other devices 1160 attached to a network or networks 1150, such as other computer systems or devices as illustrated in FIG. 1, for example. In various embodiments, network interface 1140 may support communication via any suitable wired or wireless general data networks, such as types of Ethernet network, for example. Additionally, network interface 1140 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1100 includes one or more offload cards 1170 (including one or more processors 1175, and possibly including the one or more network interfaces 1140) that are connected using an I/O interface 1130 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1100 may act as a host electronic device (e.g., operating as part of a hardware virtualization service) that hosts compute instances, and the one or more offload cards 1170 execute a virtualization manager that can manage compute instances that execute on the host electronic device. As an example, in some embodiments the offload card(s) 1170 can perform compute instance management operations such as pausing and/or un-pausing compute instances, launching and/or terminating compute instances, performing memory transfer/copying operations, etc. These management operations may, in some embodiments, be performed by the offload card(s) 1170 in coordination with a hypervisor (e.g., upon a request from a hypervisor) that is executed by the other processors 1110A-1110N of the computer system 1100. However, in some embodiments the virtualization manager implemented by the offload card(s) 1170 can accommodate requests from other entities (e.g., from compute instances themselves), and may not coordinate with (or service) any separate hypervisor.

In some embodiments, system memory 1120 may be one embodiment of a computer-accessible medium to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1100 via I/O interface 1130. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1100 as system memory 1120 or another type of memory. Further, a computer-accessible medium may include transmission media or signals such as electrical, electromagnetic, or digital signals, conveyed via a communication medium such as a network and/or a wireless link, such as may be implemented via network interface 1140.

In one embodiment, a computer-implemented method includes receiving a video file; splitting the video file into a plurality of chunks comprising a first chunk of frames of the video file and a second chunk of frames of the video file that is continuous in video order with the first chunk; encoding the first chunk into a first encoded chunk with a first encoder; determining, concurrently with the encoding of the first chunk, a rate control state element for at least one frame of the video file immediately before the second chunk in video order with a second encoder; encoding, concurrently with the encoding of the first chunk, the second chunk into a second encoded chunk using the rate control state element with the second encoder; and assembling the first encoded chunk and the second encoded chunk together to form an encoded video file. The method may include determining, concurrently with the encoding of the second chunk, a second rate control state element for at least one frame of the video file immediately after the first chunk in video order with the first encoder, wherein the encoding of the first chunk comprises encoding the first chunk into the first encoded chunk using the second rate control state element with the first encoder. The method may include determining, concurrently with the encoding of the first chunk, a third rate control state element for at least one frame of the video file immediately after the second chunk in video order with the second encoder, wherein the encoding of the second chunk comprises encoding the second chunk into the second encoded chunk using the rate control state element and the third rate control state element with the second encoder.

In another embodiment, a computer-implemented method includes receiving a video file; splitting the video file into a plurality of chunks comprising a first chunk of the video file and a second chunk of the video file that is later in video order than the first chunk; encoding the first chunk into a first encoded chunk; determining, separately from the encoding of the first chunk, a rate control state element for a section of the video file immediately before the second chunk in video order; encoding, separately from the encoding of the first chunk, the second chunk into a second encoded chunk using the rate control state element; and assembling the first encoded chunk and the second encoded chunk together to form an encoded video file. The method may include determining, separately from the encoding of the second chunk, a second rate control state element for a section of the video file immediately after the first chunk in video order, wherein the encoding of the first chunk comprises encoding the first chunk into the first encoded chunk using the second rate control state element. The method may include determining, separately from the encoding of the first chunk, a third rate control state element for a section of the video file immediately after the second chunk in video order, wherein the encoding of the second chunk comprises encoding the second chunk into the second encoded chunk using the rate control state element and the third rate control state element.

The method may include wherein the encoding of the second chunk into the second encoded chunk is a single pass through the second chunk. The method may include wherein the encoding of the first chunk into the first encoded chunk is a single pass through the first chunk. The method may include transmitting the encoded video file to a buffer of a client device. The method may include wherein the encoding of the second chunk into the second encoded chunk further comprises using a buffer status value of the buffer from the client device. Assembling may include choosing between a first encoded segment (e.g., chunk) and a second encoded segment (e.g., chunk) for the encoded video file to achieve optimal scene-change placement and/or comply with (e.g., not exceed a maximum threshold and/or fall below a minimum threshold of) the buffer status value of the client buffer (e.g., VBV buffer). The method may include wherein the encoding of the second chunk into the second encoded chunk stops at the end of the second chunk. The method may include wherein the encoding of the first chunk into the first encoded chunk stops at the end of the first chunk. The method may include wherein the encoding of the second chunk into the second encoded chunk starts at the beginning of the second chunk. The method may include receiving a request for the video file from a client device, wherein the receiving the video file comprises accessing the video file from a content data store coupled to the client device by a network.

In yet another embodiment, a system includes a content data store to store a video file; and a content manager service implemented by a first one or more electronic devices, the content manager service including instructions that upon execution cause the first one or more electronic devices to: receive the video file from the content data store, split the video file into a plurality of chunks comprising a first chunk of the video file and a second chunk of the video file that is later in video order than the first chunk, encode the first chunk into a first encoded chunk, determine, separately from the encode of the first chunk, a rate control state element for a section of the video file immediately before the second chunk in video order, encode, separately from the encode of the first chunk, the second chunk into a second encoded chunk using the rate control state element, and assemble the first encoded chunk and the second encoded chunk together to form an encoded video file. The content manager service may further include instructions that upon execution cause the first one or more electronic devices to: determine, separately from the encode of the second chunk, a second rate control state element for a section of the video file immediately after the first chunk in video order, wherein the encode of the first chunk comprises an encode of the first chunk into the first encoded chunk using the second rate control state element. The content manager service may further include instructions that upon execution cause the first one or more electronic devices to: determine, separately from the encode of the first chunk, a third rate control state element for a section of the video file immediately after the second chunk in video order, wherein the encode of the second chunk comprises an encode of the second chunk into the second encoded chunk using the rate control state element and the third rate control state element. The encode of the second chunk into the second encoded chunk may be a single pass through the second chunk. The encode of the first chunk into the first encoded chunk may be a single pass through the first chunk. The encode of the second chunk into the second encoded chunk may stop at the end of the second chunk.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 204_0 to 204_N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
    receiving a video file;
    splitting the video file into a plurality of chunks comprising a first chunk of frames of the video file and a second chunk of frames of the video file that is continuous in video order with the first chunk;
    encoding the first chunk into a first encoded chunk with a first encoder;
    determining, concurrently with the encoding of the first chunk, a rate control state element including a buffer status value of a client buffer for at least one frame of the video file immediately before the second chunk in video order with a second encoder without performing a full encode of the at least one frame of the video file immediately before the second chunk in video order;

encoding, concurrently with the encoding of the first chunk, the second chunk into a second encoded chunk using the rate control state element including the buffer status value of the client buffer with the second encoder; and assembling the first encoded chunk and the second encoded chunk together to form an encoded video file.

2. The computer-implemented method of claim 1, further comprising determining, concurrently with the encoding of the second chunk, a second rate control state element for at least one frame of the video file immediately after the first chunk in video order with the first encoder, wherein the encoding of the first chunk comprises encoding the first chunk into the first encoded chunk using the second rate control state element with the first encoder.

3. The computer-implemented method of claim 2, further comprising determining, concurrently with the encoding of the first chunk, a third rate control state element for at least one frame of the video file immediately after the second chunk in video order with the second encoder, wherein the encoding of the second chunk comprises encoding the second chunk into the second encoded chunk using the rate control state element and the third rate control state element with the second encoder.

4. A computer-implemented method comprising:
receiving a video file;
splitting the video file into a plurality of chunks comprising a first chunk of the video file and a second chunk of the video file that is later in video order than the first chunk;
encoding the first chunk into a first encoded chunk;
determining, separately from the encoding of the first chunk, a rate control state element including a buffer status value of a client buffer for a section of the video file immediately before the second chunk in video order without performing a full encode of the section of the video file immediately before the second chunk in video order;
encoding, separately from the encoding of the first chunk, the second chunk into a second encoded chunk using the rate control state element including the buffer status value of the client buffer; and
assembling the first encoded chunk and the second encoded chunk together to form an encoded video file.

5. The computer-implemented method of claim 4, further comprising determining, separately from the encoding of the second chunk, a second rate control state element for a section of the video file immediately after the first chunk in video order, wherein the encoding of the first chunk comprises encoding the first chunk into the first encoded chunk using the second rate control state element.

6. The computer-implemented method of claim 5, further comprising determining, separately from the encoding of the first chunk, a third rate control state element for a section of the video file immediately after the second chunk in video order, wherein the encoding of the second chunk comprises encoding the second chunk into the second encoded chunk using the rate control state element and the third rate control state element.

7. The computer-implemented method of claim 4, wherein the encoding of the second chunk into the second encoded chunk is a single pass through the second chunk.

8. The computer-implemented method of claim 7, wherein the encoding of the first chunk into the first encoded chunk is a single pass through the first chunk.

9. The computer-implemented method of claim 4, further comprising transmitting the encoded video file to the client buffer in a client device.

10. The computer-implemented method of claim 4, wherein the client buffer is a coded picture buffer.

11. The computer-implemented method of claim 4, wherein the encoding of the second chunk into the second encoded chunk stops at the end of the second chunk.

12. The computer-implemented method of claim 11, wherein the encoding of the first chunk into the first encoded chunk stops at the end of the first chunk.

13. The computer-implemented method of claim 12, wherein the encoding of the second chunk into the second encoded chunk starts at the beginning of the second chunk.

14. The computer-implemented method of claim 4, further comprising receiving a request for the video file from a client device, wherein the receiving the video file comprises accessing the video file from a content data store coupled to the client device by a network.

15. A system comprising:
a content data store to store a video file; and
a content manager service implemented by a first one or more electronic devices, the content manager service including instructions that upon execution cause the first one or more electronic devices to:
receive the video file from the content data store,
split the video file into a plurality of chunks comprising a first chunk of the video file and a second chunk of the video file that is later in video order than the first chunk,
encode the first chunk into a first encoded chunk,
determine, separately from the encode of the first chunk, a rate control state element including a buffer status value of a client buffer for a section of the video file immediately before the second chunk in video order without performing a full encode of the section of the video file immediately before the second chunk in video order,
encode, separately from the encode of the first chunk, the second chunk into a second encoded chunk using the rate control state element including the buffer status value of the client buffer, and
assemble the first encoded chunk and the second encoded chunk together to form an encoded video file.

16. The system of claim 15, wherein the content manager service further includes instructions that upon execution cause the first one or more electronic devices to: determine, separately from the encode of the second chunk, a second rate control state element for a section of the video file immediately after the first chunk in video order, wherein the encode of the first chunk comprises an encode of the first chunk into the first encoded chunk using the second rate control state element.

17. The system of claim 16, wherein the content manager service further includes instructions that upon execution cause the first one or more electronic devices to: determine, separately from the encode of the first chunk, a third rate control state element for a section of the video file immediately after the second chunk in video order, wherein the encode of the second chunk comprises an encode of the second chunk into the second encoded chunk using the rate control state element and the third rate control state element.

18. The system of claim 15, wherein the encode of the second chunk into the second encoded chunk is a single pass through the second chunk.

19. The system of claim 15, wherein the encode of the first chunk into the first encoded chunk is a single pass through the first chunk.

20. The system of claim 15, wherein the encode of the second chunk into the second encoded chunk stops at the end of the second chunk.

\* \* \* \* \*